United States Patent
Nomura et al.

(10) Patent No.: US 6,919,995 B2
(45) Date of Patent: Jul. 19, 2005

(54) LIGHT SHIELDING STRUCTURE OF A RETRACTABLE LENS BARREL

(75) Inventors: Hiroshi Nomura, Saitama (JP); Yoshihiro Yamazaki, Saitama (JP); Isao Okuda, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/771,299

(22) Filed: Feb. 5, 2004

(65) Prior Publication Data

US 2004/0156181 A1 Aug. 12, 2004

(30) Foreign Application Priority Data

Feb. 7, 2003 (JP) ........................................ 2003-031042

(51) Int. Cl.⁷ ................................................. G02B 15/14
(52) U.S. Cl. ........................ 359/695; 359/694; 359/704; 359/738
(58) Field of Search ................................. 359/694, 699, 359/700, 701, 703, 704, 738–740

(56) References Cited

U.S. PATENT DOCUMENTS

| | | |
|---|---|---|
| 5,488,513 A | 1/1996 | Tanaka |
| 5,589,987 A | 12/1996 | Tanaka |
| 6,104,550 A | 8/2000 | Azegami et al. |
| 6,256,458 B1 * | 7/2001 | Iwasa ........................... 396/85 |
| 6,324,019 B1 * | 11/2001 | Takanashi et al. .......... 359/704 |
| 2004/0156122 A1 * | 8/2004 | Nomura et al. ............. 359/694 |
| 2004/0156123 A1 * | 8/2004 | Nomura et al. ............. 359/699 |
| 2004/0156127 A1 * | 8/2004 | Nomura et al. ............. 359/821 |
| 2004/0160679 A1 * | 8/2004 | Nomura et al. ............. 359/701 |
| 2004/0160683 A1 * | 8/2004 | Nomura et al. ............. 359/819 |
| 2004/0228006 A1 * | 11/2004 | Yasutomi et al. ........... 359/699 |

* cited by examiner

*Primary Examiner*—Georgia Epps
*Assistant Examiner*—Ricky L. Mack
(74) *Attorney, Agent, or Firm*—Greenblum & Bernstein, P.L.C.

(57) ABSTRACT

A light shielding structure of a retractable lens barrel includes a lens system, a lens frame to which a lens group is fixed; at least one movable annular member into which the lens frame is screw-engaged, and which is moved along the optical axis in a predetermined moving manner; a light shield member which is supported by the movable annular member to be movable along the optical axis relative to the movable annular member, and having a rearward movement extremity relative to the movable annular member; and a biasing member which is positioned between the light shield member and the lens frame in a compressed fashion to bias the light shield member toward the rearward movement extremity thereof relative to the movable annular member.

11 Claims, 19 Drawing Sheets

LIGHT SHIELDING STRUCTURE OF A RETRACTABLE LENS BARREL

BACKGROUND OF THE INVENTION

1. Field of the Invention

The present invention relates to a light shielding structure of a retractable lens barrel.

2. Description of the Related Art

A light shielding structure of a retractable lens barrel in which a light shielding member for preventing harmful light such as stray light from entering into an optical path of the lens barrel is supported by a lens frame that supports one or more lens groups is known in the art.

In a retractable lens barrel having such a conventional light shielding structure, the light shielding member is required to be disposed at a position sufficiently apart from the lens frame because the distance between adjacent lens groups varies greatly. This requirement tends to be significant in the case of a retractable zoom lens barrel which adopts a zoom lens optical system having a high zoom ratio; moreover, this retractable zoom lens barrel requires a lens-group-position adjusting mechanism or the like. This makes it even more difficult to achieve a reduction in length of the retractable zoom lens barrel and miniaturization of the zoom lens barrel.

SUMMARY OF THE INVENTION

The present invention provides a light shielding structure, provided in a retractable lens barrel, which makes a further reduction in length of the lens barrel and miniaturization of the lens barrel possible.

According to an aspect of the present invention, light shielding structure of a retractable lens barrel is provided, including a lens system, a position of the lens system changing between a ready-to-photograph position and a retracted position, the light shielding structure including a lens frame to which a lens group of the lens system is fixed, a position of the lens group in an optical axis direction being adjusted during assembly; at least one movable annular member into which the lens frame is screw-engaged, and which is moved along the optical axis in a predetermined moving manner; a light shield member which prevents harmful light rays from entering the lens system, the light shield member being supported by the movable annular member to be movable along the optical axis relative to the movable annular member, while restricting a rearward movement limit of the light shield member relative to the movable annular member; and a biasing member which is positioned between the light shield member and the lens frame in a compressed fashion to bias the light shield member toward the rearward movement limit thereof relative to the movable annular member.

It is desirable for the lens system to include a zoom lens optical system which changes a focal length during a zooming operation, wherein the movable annular member includes a moving ring which is moved along the optical axis by a cam mechanism in accordance with the zooming operation; and an intermediate ring into which the lens frame is screw-engaged, the intermediate ring being supported by the moving ring to be movable along the optical axis relative to the moving ring, a forward movement limit of the intermediate ring being restricted relative to the moving ring. The light shielding structure includes a second biasing member for continuously biasing the intermediate ring forward.

It is desirable for the lens group that is fixed to the lens frame to serves as a power-varying lens group of the lens system which is moved to vary a focal length.

It is desirable for a male screw thread formed on an outer peripheral surface of the lens frame to be engaged with a female screw thread formed on an inner peripheral surface of the intermediate ring.

It is desirable for the intermediate ring to be linearly guided along the optical axis without rotating relative to the moving ring.

It is desirable for the biasing member to be a compression coil spring.

It is desirable for the second biasing member to be a compression coil spring.

The light shield member can include a ring portion positioned around the optical axis; and a plurality of leg portions which extend forward from the ring portion so that front ends of the plurality of leg portions are engaged with the intermediate ring.

It is desirable for the lens group to be positioned behind a frontmost lens group of the lens system.

It is desirable for the cam mechanism to include a cam ring which is positioned around the moving ring to be rotatable relative to the moving ring, and includes a plurality of inner cam grooves formed on an inner peripheral surface of the cam ring; and a plurality of cam followers which project radially outwards from the moving ring to be engaged in the plurality of inner cam grooves, respectively.

It is desirable for the retractable lens barrel to include a linear guide mechanism, positioned between the moving ring and the intermediate ring, for guiding the intermediate ring linearly along the optical axis without rotating the intermediate ring relative to the moving ring.

The present disclosure relates to subject matter contained in Japanese Patent Application No. 2003-031042 (filed on Feb. 7, 2003) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
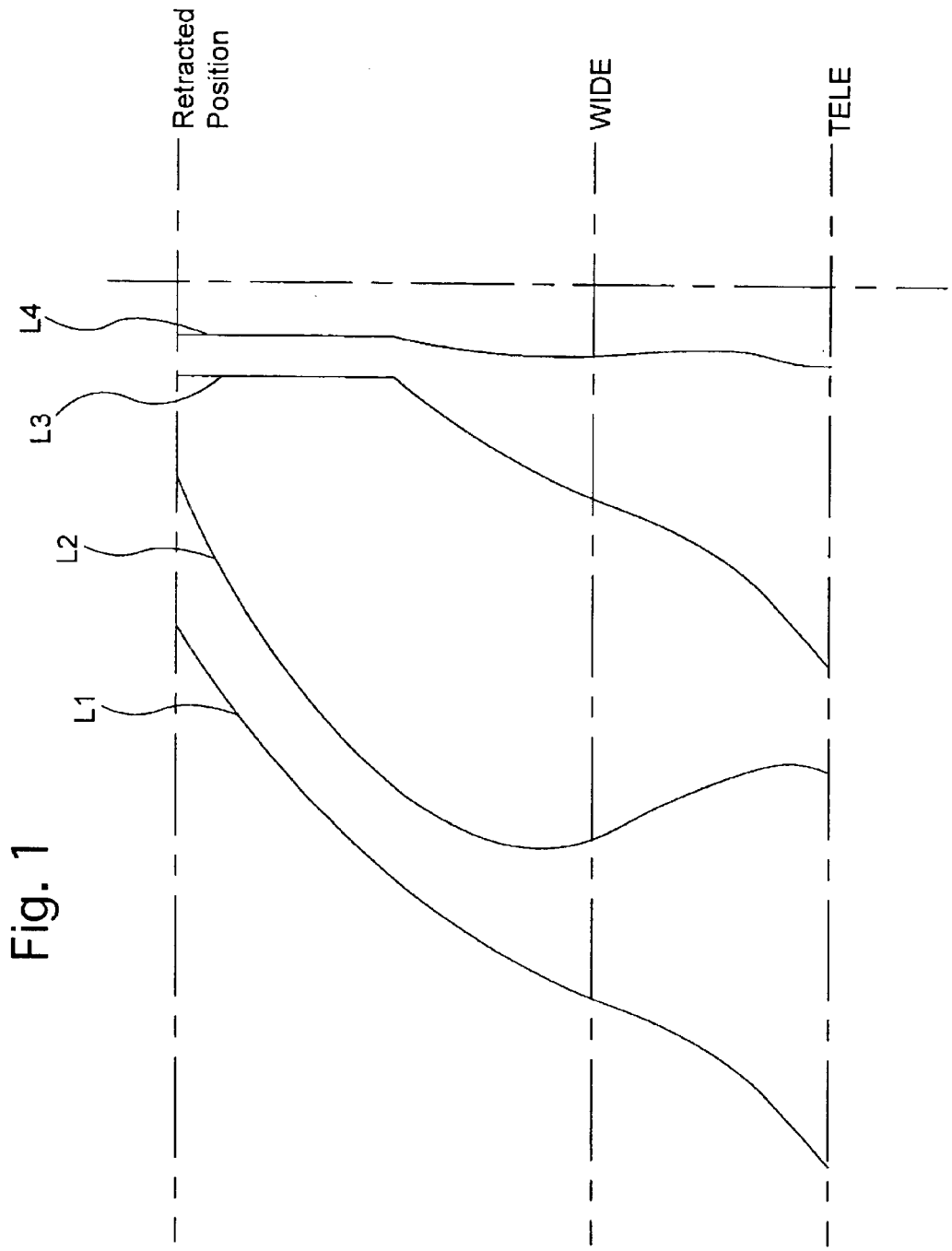
FIG. 1 is a diagram showing reference moving paths of zoom lens groups of a zoom lens system provided in an embodiment of a zoom lens barrel according to the present invention.
Figure 2:
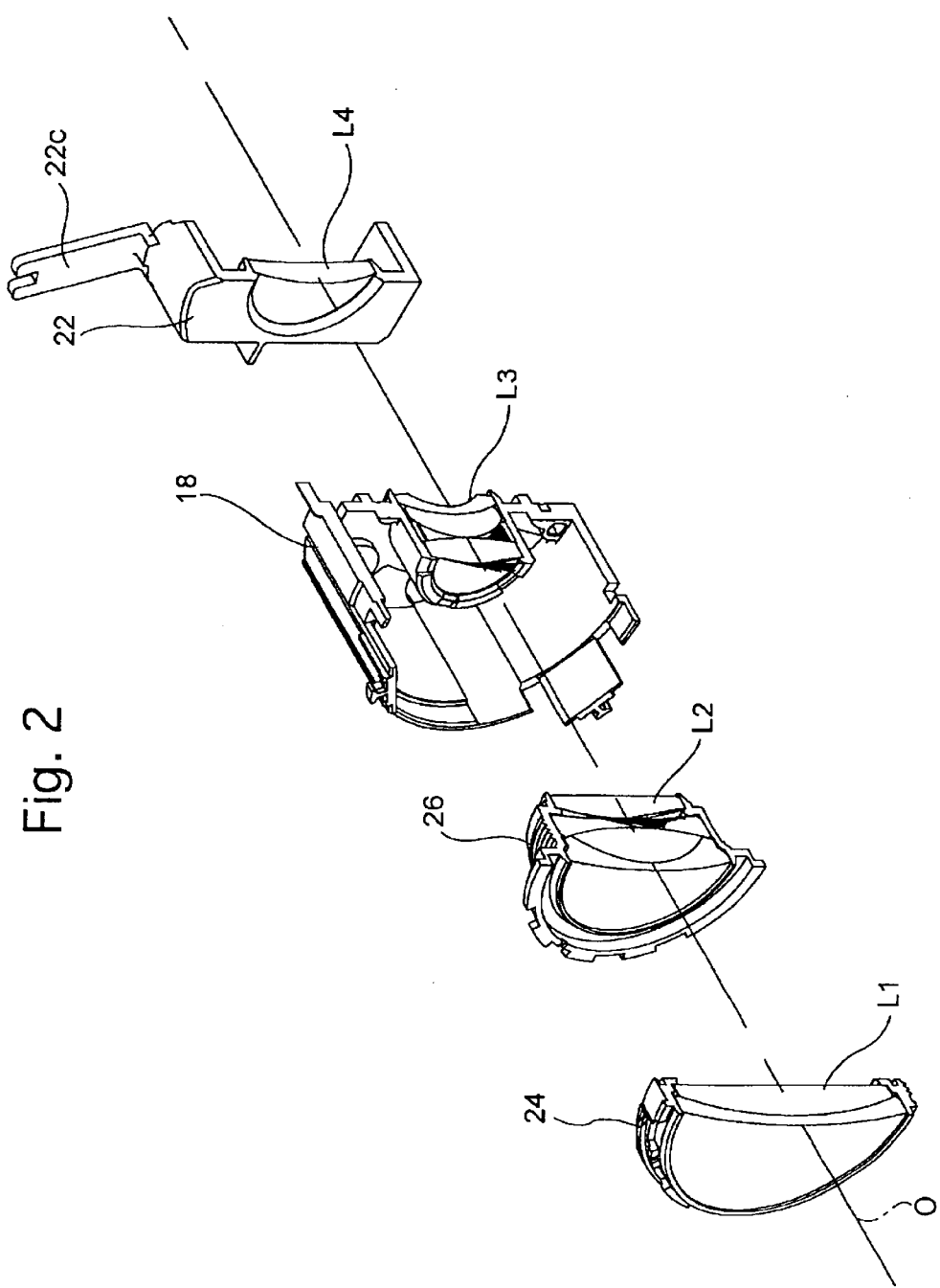
FIG. 2 is an exploded perspective view in axial section of the zoom lens groups and lens support frames therefor.

First of all, a zoom lens system (zoom lens optical system) provided in an embodiment of a zoom lens barrel of a camera according to the present invention will be hereinafter discussed with reference to FIGS. 1 through 5. The zoom lens system of the zoom lens barrel 10 is a vari-focal lens system consisting of four lens groups: a positive first lens group L1, a negative second lens group L2, a positive third lens group L3 and a positive fourth lens group L4, in that order from the object side (left side as viewed in FIG. 3). The first through third lens groups L1, L2 and L3 are moved relative to one another along an optical axis O to vary the focal length of the zoom lens system and the fourth lens group L4 is moved along the optical axis O to make a slight focus adjustment, i.e., to adjust a slight focus deviation caused by the variation of the focal length. During the operation of varying the focal length of the zoom lens system between wide angle and telephoto, the first lens group L1 and the third lens group L3 move along the optical axis while maintaining the distance therebetween. The fourth lens group L4 also serves as a focusing lens group. FIG. 1 shows both moving paths of the first through fourth lens groups L1 through L4 during the zooming operation and moving paths for advancing/retracting operation. By definition, a vari-focal lens is one whose focal point slightly varies when varying the focal length, and a zoom lens is one whose focal point does not vary substantially when varying the focal length. However, the vari-focal lens system of the present invention is also hereinafter referred to as a zoom lens system.

The overall structure of the zoom lens barrel 10 will be hereinafter discussed with reference to FIGS. 1 through 19.

Figure 8:
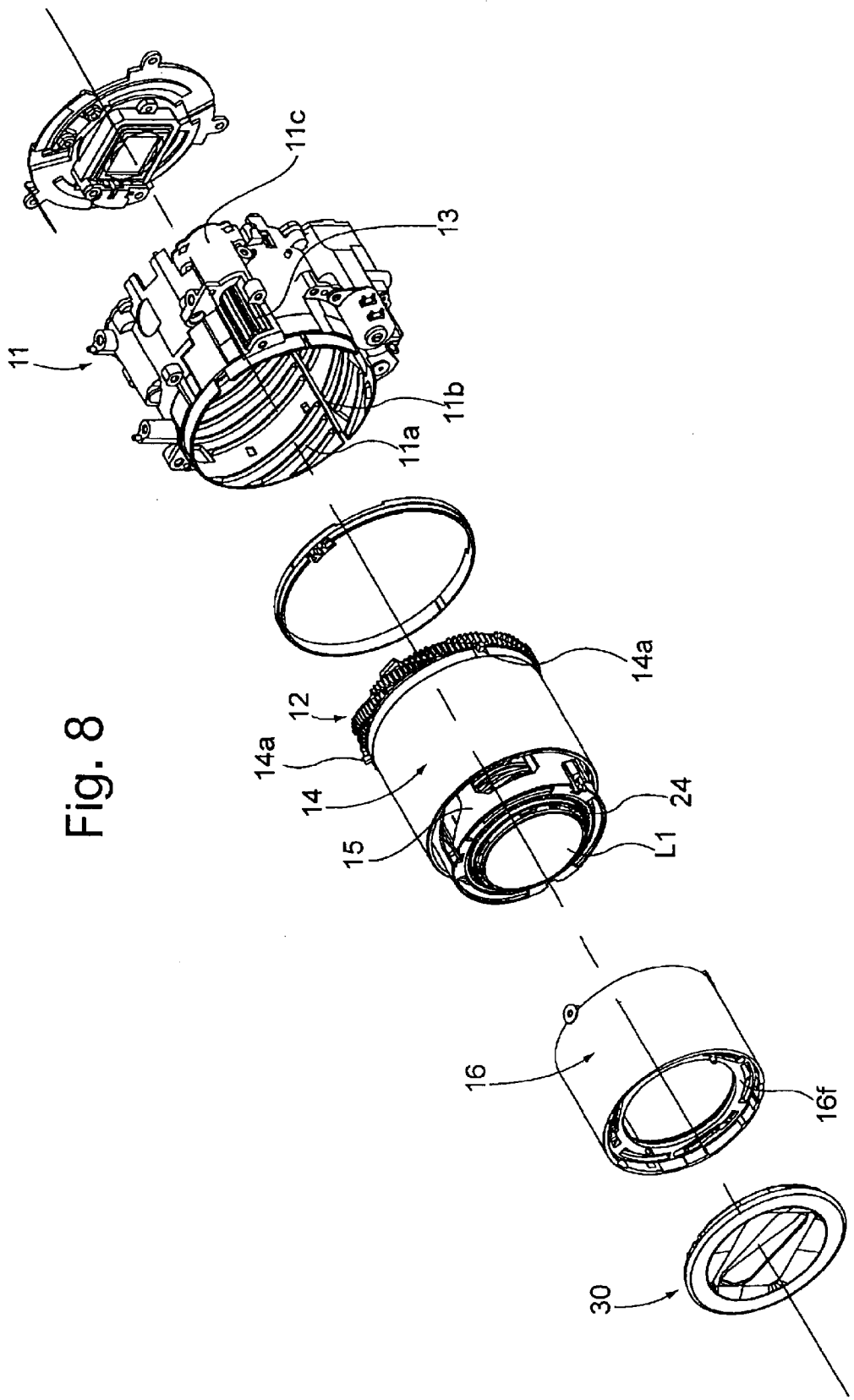
FIG. 8 is an exploded perspective view of a portion of the zoom lens barrel shown in FIG. 3.
Figure 9:
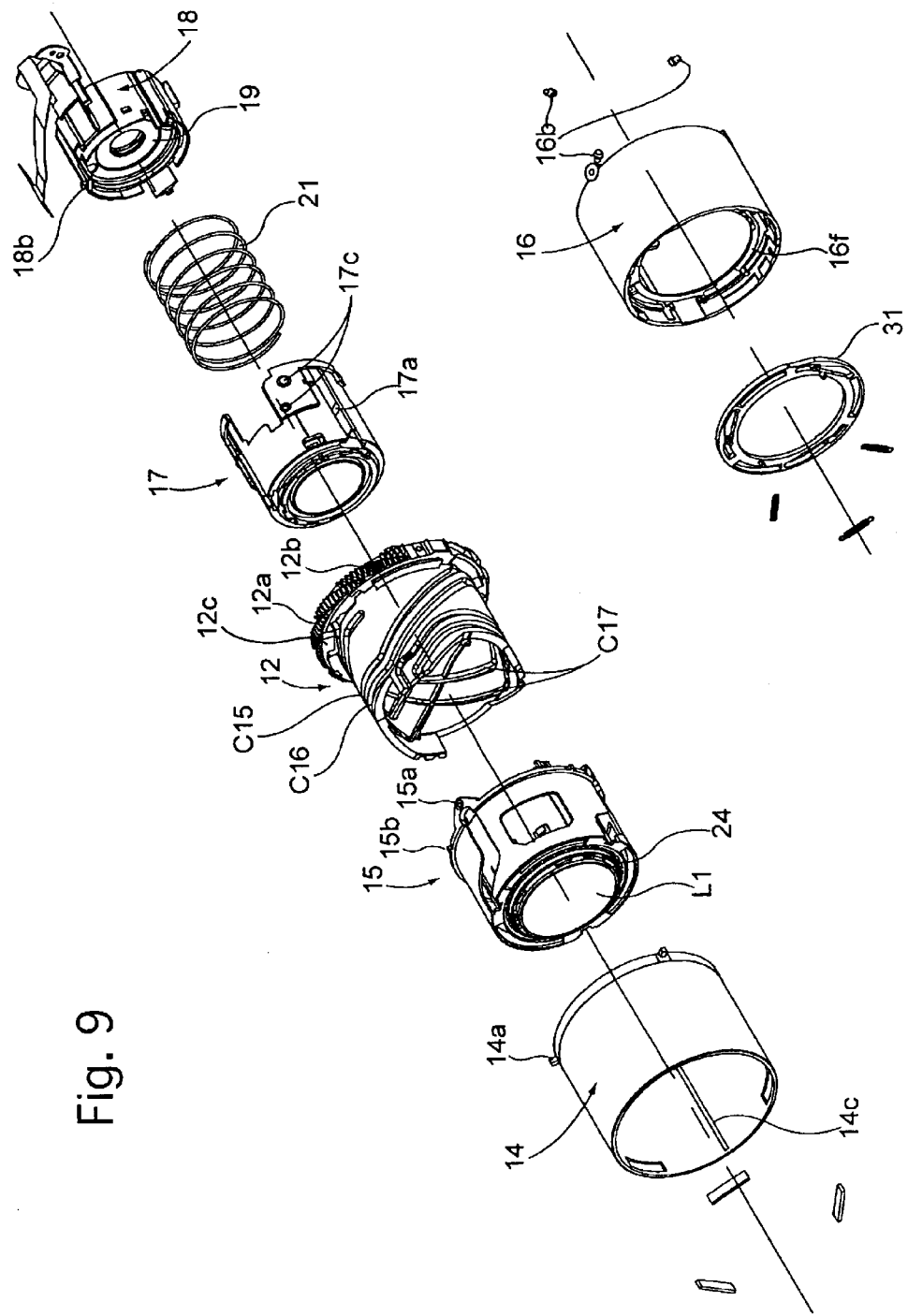
FIG. 9 is an exploded perspective view of a portion of the zoom lens barrel shown in FIG. 3.
Figure 10:
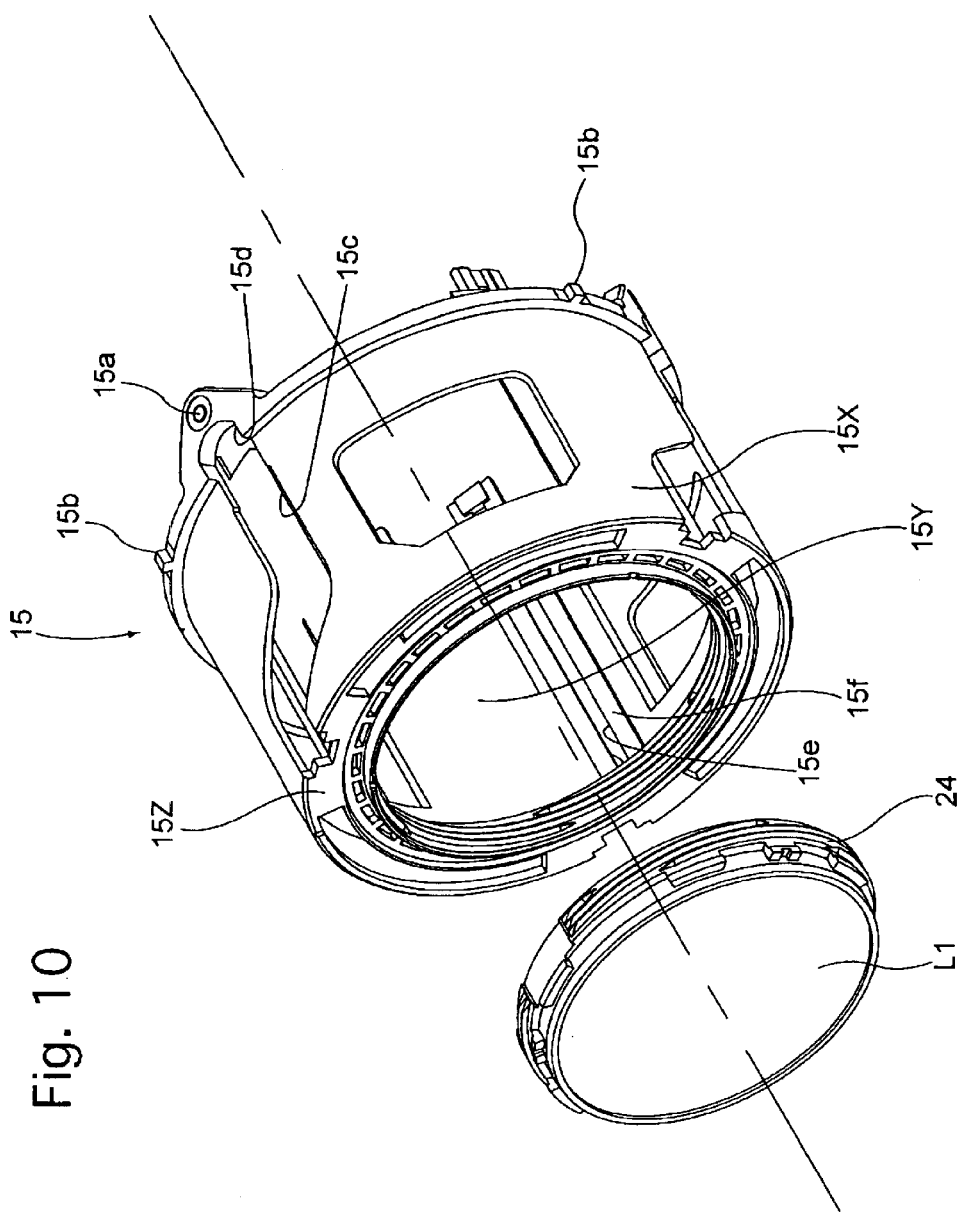
FIG. 10 is an exploded perspective view of a portion of the zoom lens barrel shown in FIG. 3, showing a first lens group moving ring and peripheral elements.

The zoom lens barrel 10 is provided with a stationary barrel 11 which is fixed to a camera body (not shown). As shown in FIG. 8, the stationary barrel 11 is provided on an inner peripheral surface thereof with a female helicoid 11a and a set of three linear guide grooves 11b which extend parallel to the optical axis O. The zoom lens barrel 10 is provided inside the stationary barrel 11 with a cam/helicoid ring (cam ring) 12. As shown in FIG. 9, the cam/helicoid ring 12 is provided, on an outer peripheral surface thereof in the vicinity of the rear end of the cam/helicoid ring 12, with a male helicoid 12a which is engaged with the female helicoid 11a of the stationary barrel 11. The cam/helicoid ring 12 is provided on the thread of the male helicoid 12a with a spur gear 12b which is always engaged with a drive pinion 13 (see FIG. 15). The drive pinion 13 is provided in a recessed portion 11c (see FIG. 3) formed on an inner peripheral surface of the stationary barrel 11. The drive pinion 13 is supported by the stationary barrel 11 to be freely rotatable in the recessed portion 11c on an axis of the drive pinion 13. Accordingly, forward and reverse rotations of the drive pinion 13 cause the cam/helicoid ring 12 to move forward rearward along the optical axis O while rotating about the optical axis O due to the engagement of the drive pinion 13 with the spur gear 12b and the engagement of the female helicoid 11a with the male helicoid 12a. In the present embodiment of the zoom lens barrel 10, the cam/helicoid ring 12 is the only element thereof which rotates about the optical axis O.

The zoom lens barrel 10 is provided around the cam/helicoid ring 12 with a linear guide ring 14. The linear guide ring 14 is provided, on an outer peripheral surface thereof at the rear end of the linear guide ring 14, with a set of three linear guide projections 14a which project radially outwards to be engaged in the set of three linear guide grooves 11b of the stationary barrel 11, respectively. The linear guide ring 14 is provided, on an inner peripheral surface thereof at the rear end of the linear guide ring 14, with a set of three bayonet lugs 14b (only one of them appears in FIGS. 1 through 4). The cam/helicoid ring 12 is provided, on an outer peripheral surface thereof immediately in front of the male helicoid 12a (the spur gear 12b), with a circumferential groove 12c in which the set of three bayonet lugs 14b are engaged to be rotatable about the optical axis O in the circumferential groove 12c. Accordingly, the linear guide ring 14 is linearly movable along the optical axis O together with the cam/helicoid ring 12 without rotating about the optical axis O.

Figure 4:
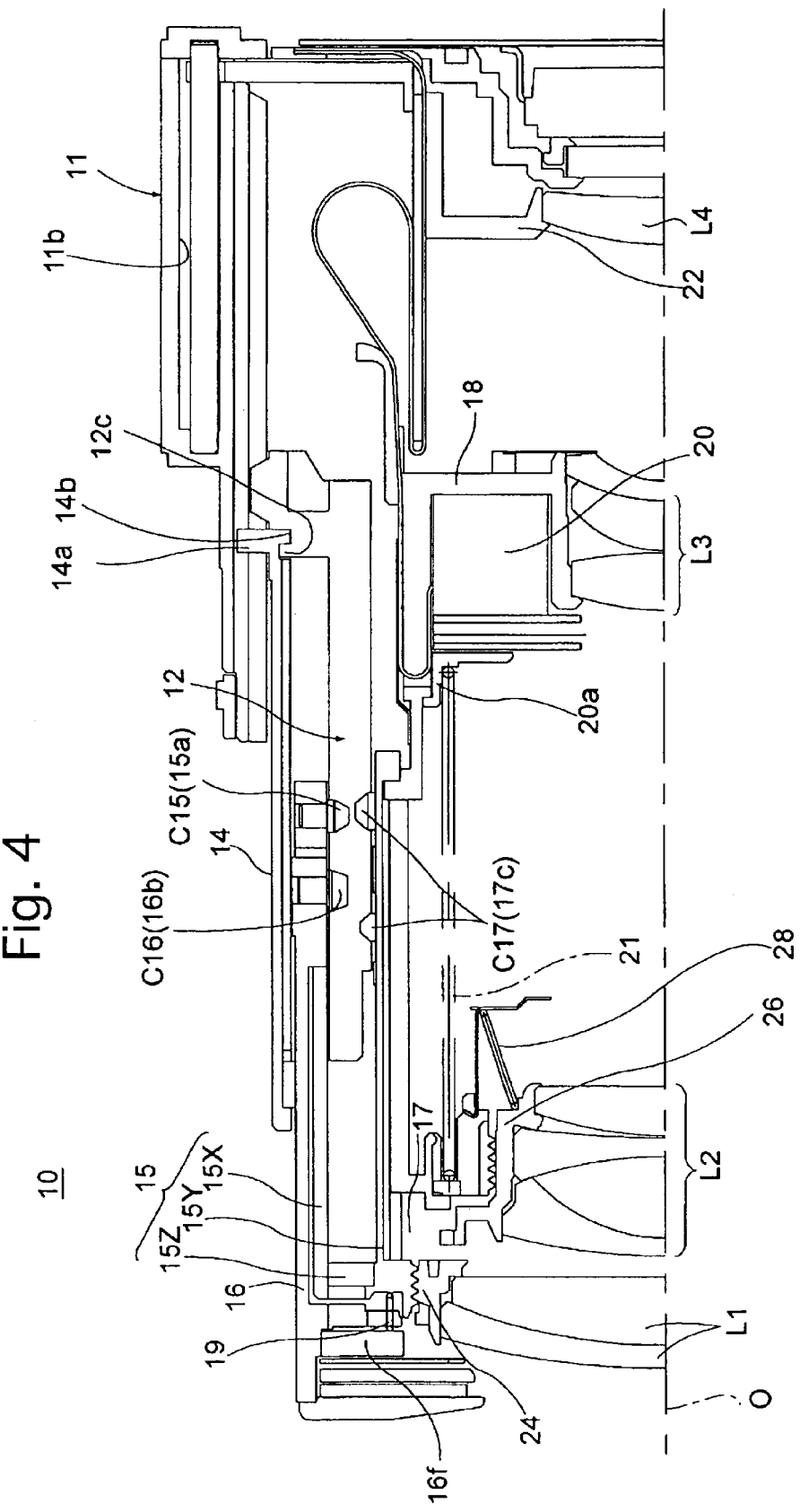
FIG. 4 is a view similar to that of FIG. 3, and shows an upper half of the zoom lens barrel from the optical axis thereof at the wide-angle extremity.
Figure 16:
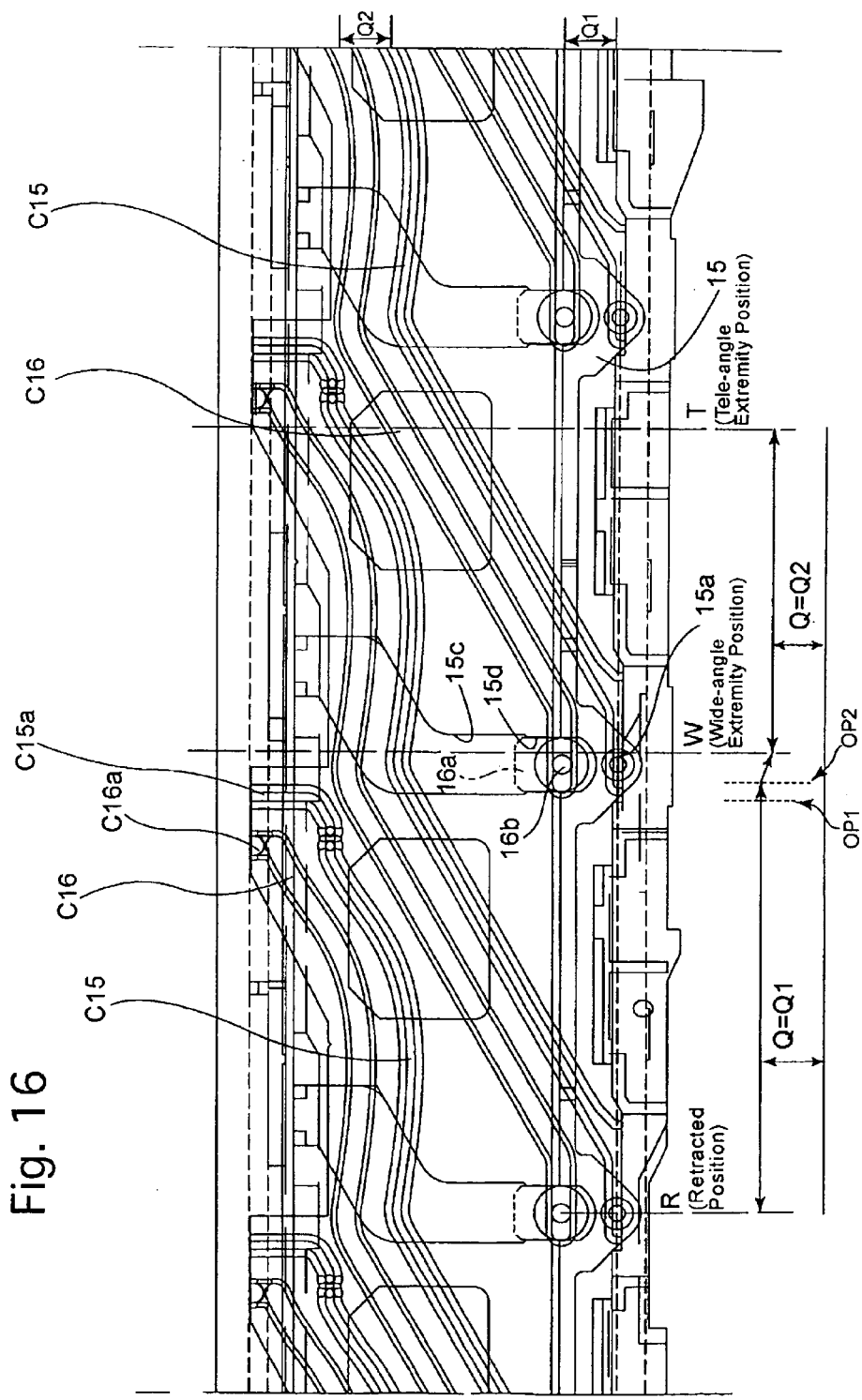
FIG. 16 is a developed view of a cam/helicoid ring, showing a set of first cam grooves of the cam/helicoid ring for moving the first lens group and a set of third cam grooves of the cam/helicoid ring for moving an exterior ring.

The zoom lens barrel 10 is provided around the cam/helicoid ring 12 with a first lens group moving ring (first lens frame) 15 which supports the first lens group L1, and is further provided around the first lens group moving ring 15 with an exterior ring 16 serving as a light shield member. The zoom lens barrel 10 is provided inside the cam/helicoid ring 12 with a second lens group moving ring (second lens frame) 17 which supports the second lens group L2. As shown in FIGS. 4, 9 and 16, the cam/helicoid ring 12 is provided on an outer peripheral surface thereof with a set of three first cam grooves C15 for moving the first lens group moving ring 15 and a set of three third cam grooves C16 for moving the exterior ring 16, and is further provided on an inner peripheral surface of the cam/helicoid ring 12 with a set of six second cam grooves C17 for moving the second lens group moving ring 17 (see FIG. 19). The set of three first cam grooves C15 and the set of three third cam grooves C16 are slightly different in shape, and are apart from one another at predetermined intervals in a circumferential direction of the cam/helicoid ring 12. The set of six second cam grooves C17 have the same basic cam diagrams, and includes three front second cam grooves C17, and three rear second cam grooves C17 which are positioned behind the three front second cam grooves C17 in the optical axis direction (vertical direction as viewed in FIG. 19), respectively; the three front second cam grooves C17 are apart from one another in a circumferential direction of the cam/helicoid ring 12 while the three rear second cam grooves C17 are apart from one another in a circumferential direction of the cam/helicoid ring 12. Each of the first lens group moving ring 15, the exterior ring 16 and the second lens group moving ring 17 is linearly guided along the optical axis O. A rotation of the cam/helicoid ring 12 causes the first lens group moving ring 15, the exterior ring 16 and the second lens group moving ring 17 to move along the optical axis O in accordance with the contours of the set of three first cam grooves C15, the set of three third cam grooves C16 and the set of six second cam grooves C17, respectively.

Figure 5:
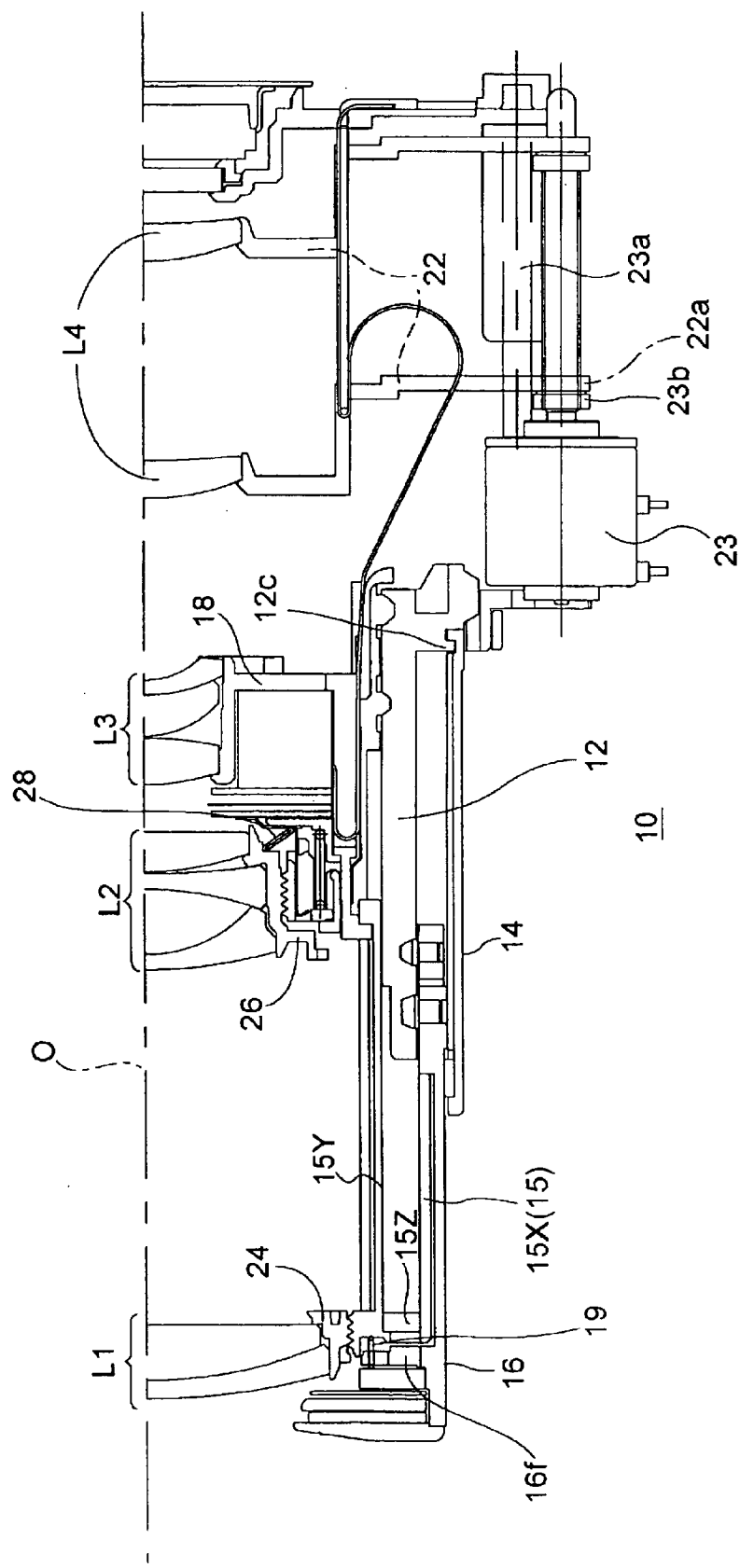
FIG. 5 is a view similar to that of FIG. 3, and shows a lower half of the zoom lens barrel from the optical axis thereof at the telephoto extremity.

Linear guide mechanical linkages among the first lens group moving ring 15, the exterior ring 16 and the second lens group moving ring 17 will be discussed hereinafter. As shown in FIGS. 4 and 5, the first lens group moving ring 15 is provided with an outer ring portion 15X, an inner ring portion 15Y and a flange wall 15Z by which the front end of the outer ring portion 15X and the front end of the inner ring portion 15Y are connected to have a substantially U-shaped cross section. The cam/helicoid ring 12 is positioned between the outer ring portion 15X and the inner ring portion 15Y. Three cam followers 15a which are respectively engaged in the set of three first cam grooves C15 are fixed to the outer ring portion 15X in the vicinity of the rear end thereof. The zoom lens barrel 10 is provided with a first lens group support frame 24 which supports the first lens group L1. As shown in FIGS. 8 and 9, the first lens group support frame 24 is fixed to the inner ring portion 15Y at the front end thereof through a male thread portion and a female thread portion which are formed on an outer peripheral surface of the first lens group support frame 24 and an inner peripheral surface of the inner ring portion 15Y, respectively (see FIG. 10). The first lens group support frame 24 can be rotated relative to the first lens group moving ring 15 to adjust the position of the first lens group support frame 24 along the optical axis O relative to the first lens group moving ring 15 to carry out a zooming adjustment (which is an adjustment operation which is carried out in a manufacturing process of the zoom lens barrel if necessary).

The linear guide ring 14, which is linearly guided along the optical axis O by the stationary barrel 11, is provided, on an inner peripheral surface thereof at approximately equiangular intervals (intervals of approximately 120 degrees), with a set of three linear guide grooves 14c (only one of them appears in FIG. 9), while the outer ring portion 15X of the first lens group moving ring 15 is provided at the rear end thereof with a set of three linear guide projections 15b (see FIG. 10) which project radially outwards to be engaged in the set of three linear guide grooves 14c, respectively. The outer ring portion 15X is provided with a set of three assembly slots 15c (see FIGS. 10 and 16), and is further provided at the rear ends of the set of three assembly slots 15c with a set of linear guide slots 15d which are communicatively connected with the set of three assembly slots 15c and are smaller in width than the set of three assembly slots 15c, respectively. Three linear guide keys 16a which are fixed to the exterior ring 16 which is positioned between the outer ring portion 15X and the linear guide ring 14 are engaged in the set of linear guide slots 15d, respectively. The maximum relative moving distance between the first lens group moving ring 15 and the exterior ring 16 along the optical axis O (the difference in shape between the set of three first cam grooves C15 and the set of three third cam grooves C16) is only a slight distance, and the length of each linear guide slot 15d in the optical axis direction is correspondingly short. A set of three cam followers 16b which are engaged in the set of three third cam grooves C16 are fixed to the set of three linear guide keys 16a, respectively (see FIGS. 7 and 9).

Figure 3:
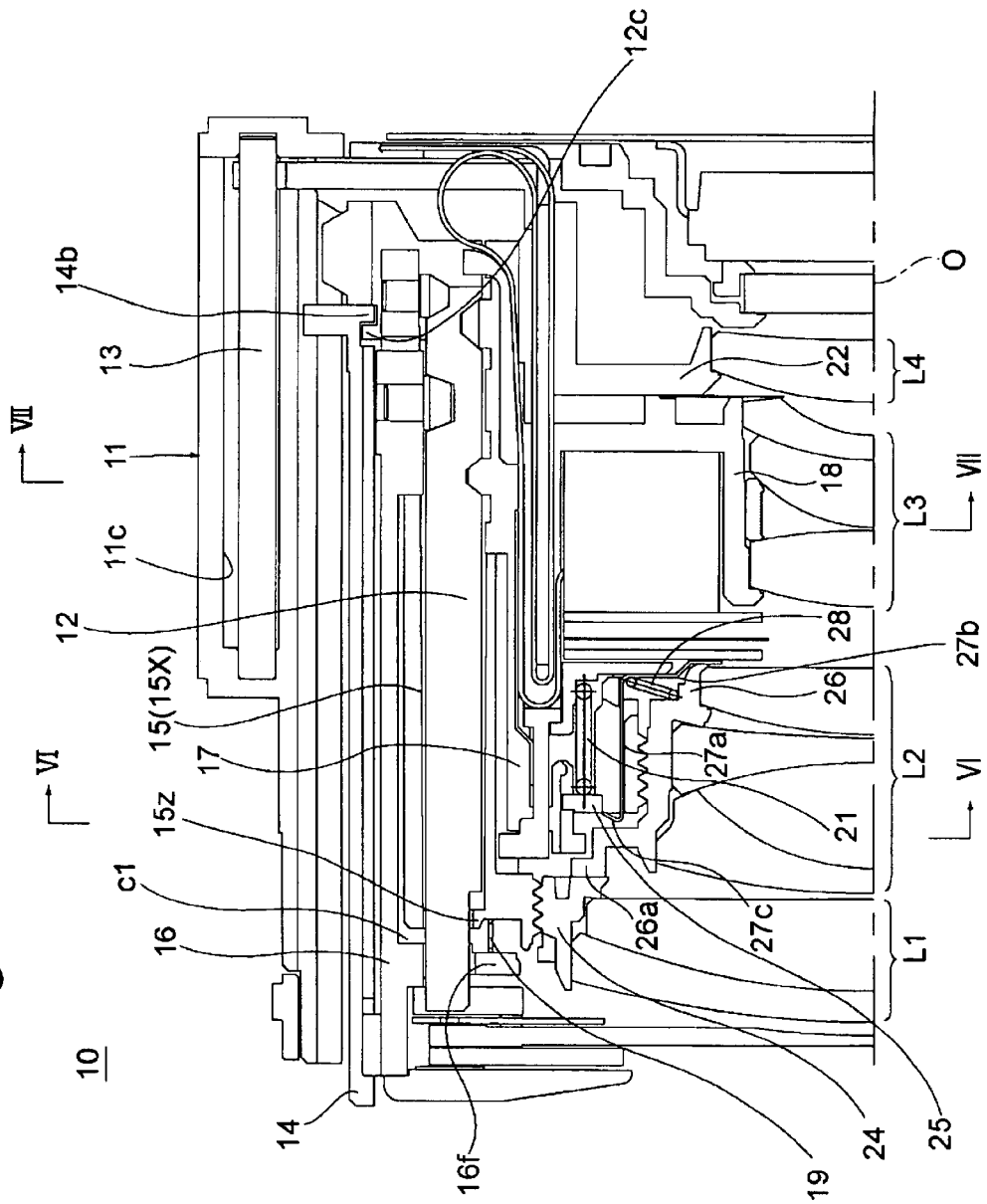
FIG. 3 is a longitudinal cross sectional view of the embodiment of the zoom lens barrel according to the present invention, showing an upper half of the zoom lens barrel from the optical axis thereof in a retracted state.

The zoom lens barrel 10 is provided between the first lens group moving ring 15 and the exterior ring 16 with a compression coil spring 19 (see FIGS. 3 through 5). The compression coil spring 19 biases the first lens group moving ring 15 rearward to remove backlash between the set of three first cam grooves C15 and the set of three cam followers 15a, and at the same time, biases the exterior ring 16 forward to remove backlash between the set of three third cam grooves C16 and the set of three cam followers 16b.

As shown in FIG. 16, the set of three first cam grooves C15 and the set of three third cam grooves C16 are shaped slightly different from each other in their respective retracting positions, as compared with their respective photographing ranges (zooming ranges), so that the exterior ring 16 advances from the photographing position thereof relative to the first lens group moving ring 15 to prevent barrier blades of a lens barrier unit 30 (see FIG. 8) and the first lens group L1 from interfering with each other when the zoom lens barrel 10 is fully retracted as shown in FIG. 3. More specifically, as shown in FIG. 16, the shapes of the first cam grooves C15 and the third cam grooves C16 are determined so that the distance Q in the optical axis direction between the first cam grooves C15 and the third cam grooves C16 in the preparation ranges (i.e., the range between the retracted position and the position at which the lens barrier unit 30 is fully open) is longer than that of the zoom ranges (i.e., the range between the wide-angle extremity and the telephoto extremity). Namely, throughout the entirety of the preparation ranges the distance Q=Q1, however, the distance Q gradually reduces from a position OP2 at a predetermined distance from a fully opened position OP1 of the lens barrier unit 30 (i.e., from a position whereby the first lens group L1 and the lens barrier unit 30 do not interfere with each other), so that the distance Q=Q2 (<Q1) at the wide-angle extremity, and the distance Q=Q2 in the entirety of the zoom ranges.

It can be seen in FIG. 3 that a clearance c1 between the flange wall 15Z of the first lens group moving ring 15 and a flange wall 16f of the exterior ring 16 when the zoom lens barrel 10 is in the retracted position is greater than that when the zoom lens barrel 10 is in a ready-to-photograph position as shown in FIG. 4 or 5. In other words, when the zoom lens barrel 10 is in a ready-to-photograph position as shown in FIG. 4 or 5, the flange wall 15Z of the first lens group moving ring 15 and the flange wall 16f of the exterior ring 16 are positioned closely to each other to reduce the length of the zoom lens barrel 10. The lens barrier unit 30 is supported by the exterior ring 16 at the front end thereof. The zoom lens barrel 10 is provided, immediately behind the lens barrier unit 30 (between the lens barrier unit 30 and the flange wall 16f of the exterior ring 16), with a barrier opening/closing ring 31 (see FIG. 9). Rotating the barrier opening/closing ring 31 at the retracted position via rotation of the cam/helicoid ring 12 causes the barrier blades of the lens barrier unit 30 to open and shut. The mechanism for opening and closing the barrier blades using a barrier opening/closing ring such as the barrier opening/closing ring 31 is known in the art.

Note that in the illustrated embodiment, although the shapes of the first cam grooves C15 and the third cam grooves C16 are determined so that the distance Q (i.e., Q2) is constant (unchanging) over the entire zoom range, the distance Q (i.e., Q2) can be determined so as to change in accordance with the focal length. Furthermore, the distance Q2 over the zoom range can be determined so as to be greater than the distance Q1 over the preparation range.

The front end of each third cam groove C16 is open on a front end surface of the cam/helicoid ring 12 to be formed as an open end C16a (see FIG. 16) through which the associated cam follower 16b of the exterior ring 16 is inserted into the third cam groove C16. Likewise, the front end of each first cam groove C15 is open on a front end surface of the cam/helicoid ring 12 to be formed as an open end C15a (see FIG. 16) through which the associated cam follower 15a of the first lens group moving ring 15 is inserted into the first cam groove C15.

Figure 6:
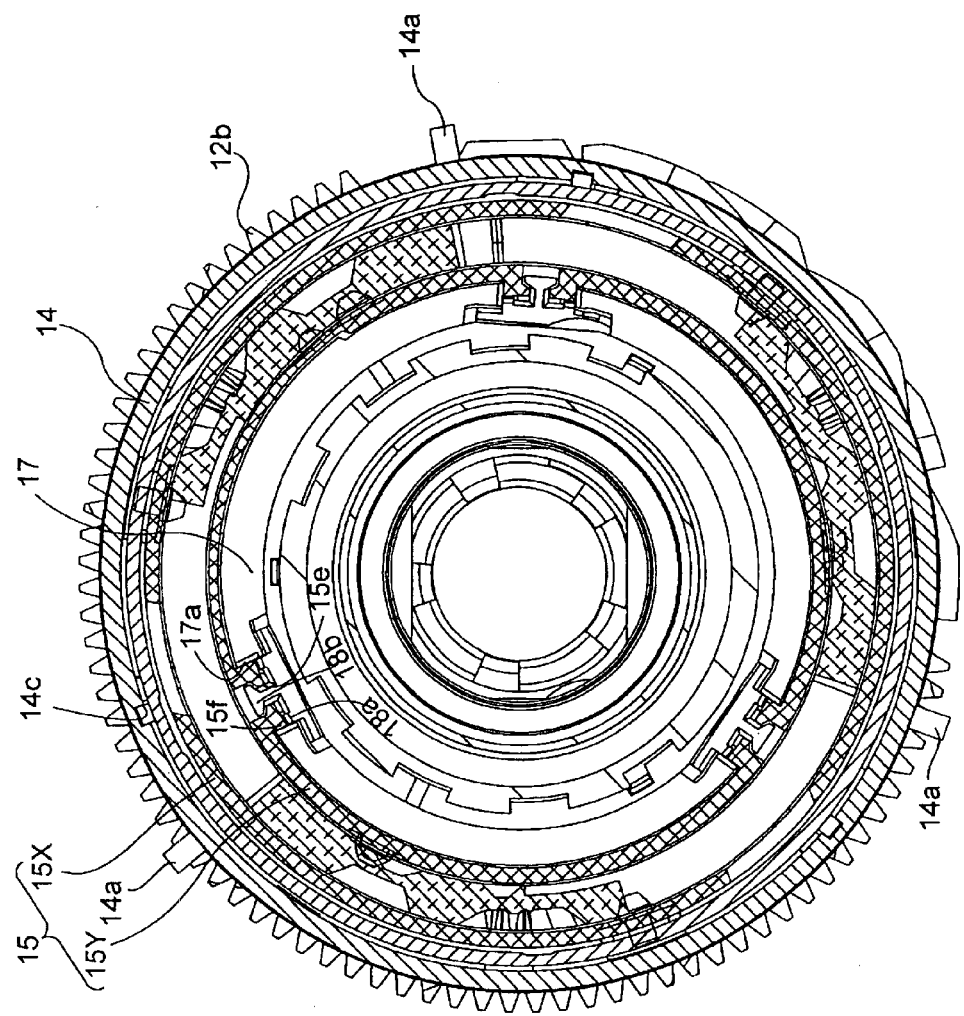
FIG. 6 is a transverse cross sectional view taken along VI—VI line shown in FIG. 3.
Figure 7:
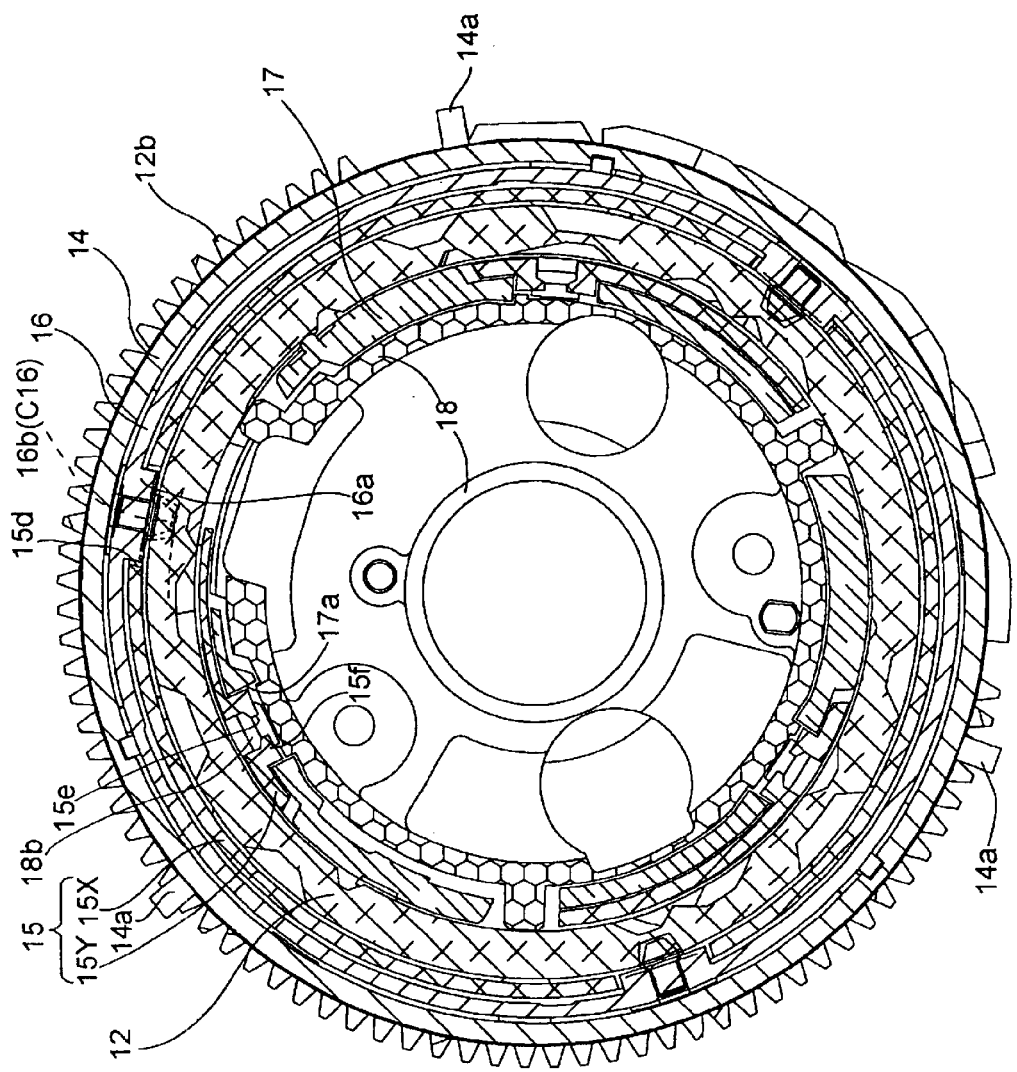
FIG. 7 is a transverse cross sectional view taken along VII—VII line shown in FIG. 3.
Figure 17:
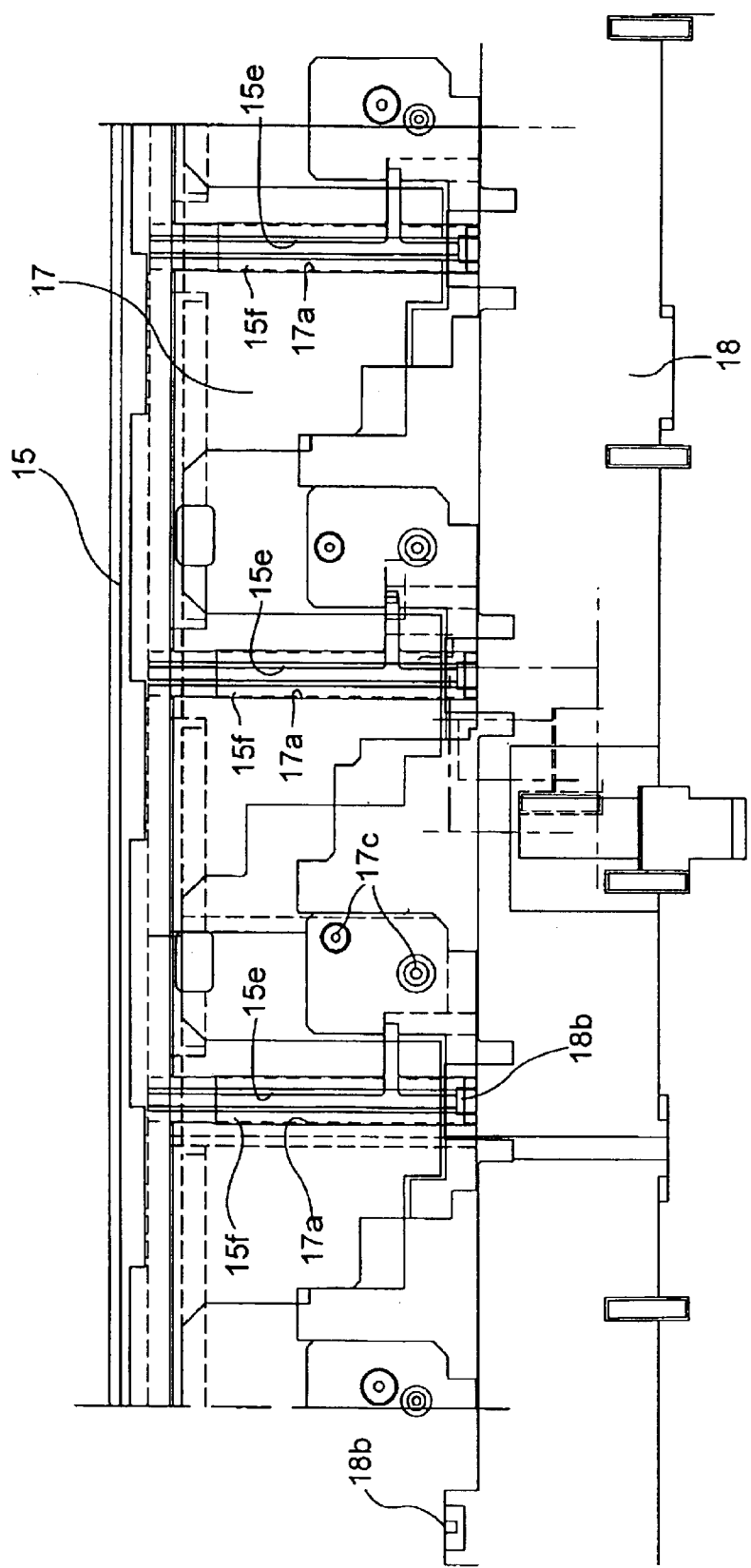
FIG. 17 is a developed view of the first lens group moving ring, the second lens group moving ring and the third lens group moving ring, showing linear guide mechanical linkages among the first through third lens group moving rings.
Figure 18:
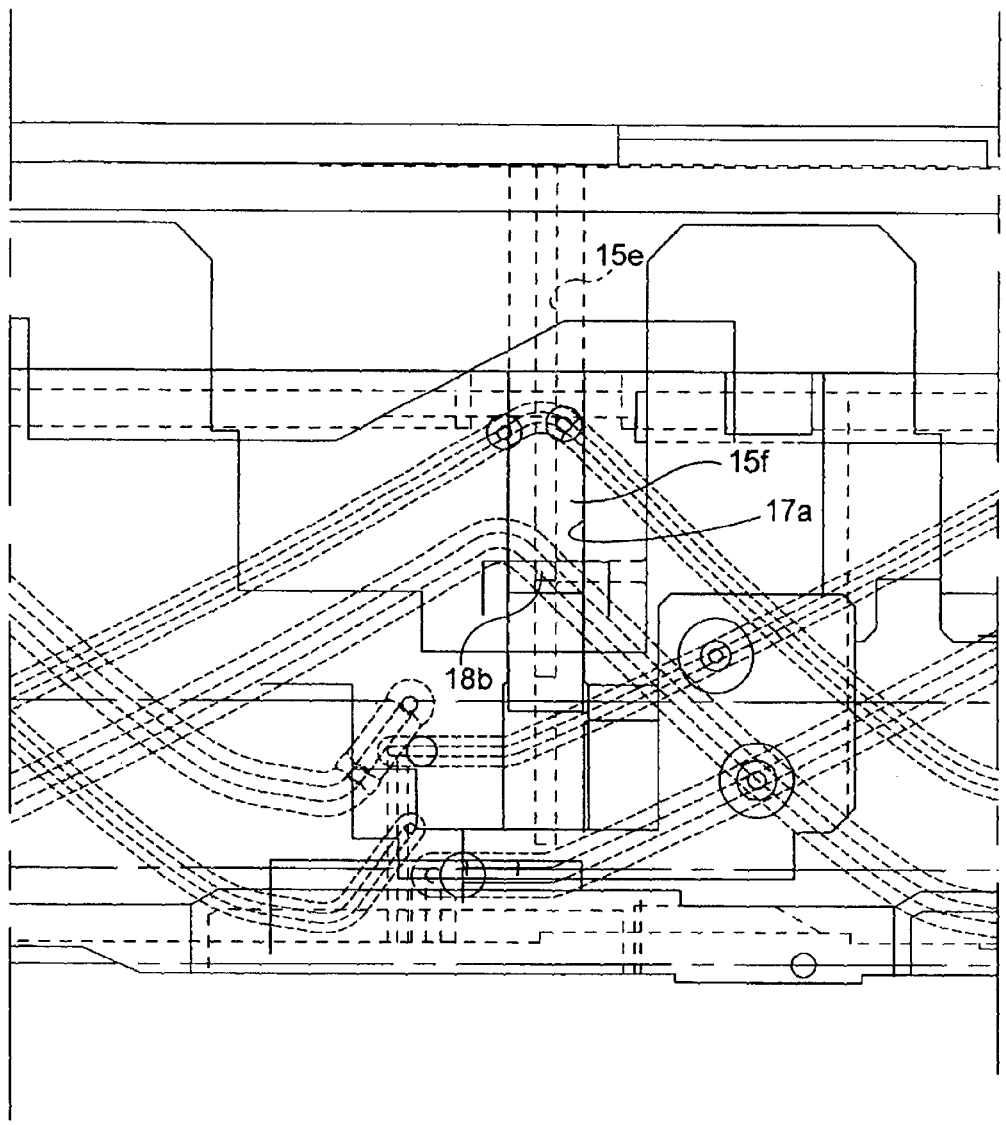
FIG. 18 is an enlarged view of a portion of the developed view shown in FIG. 17.
Figure 19:
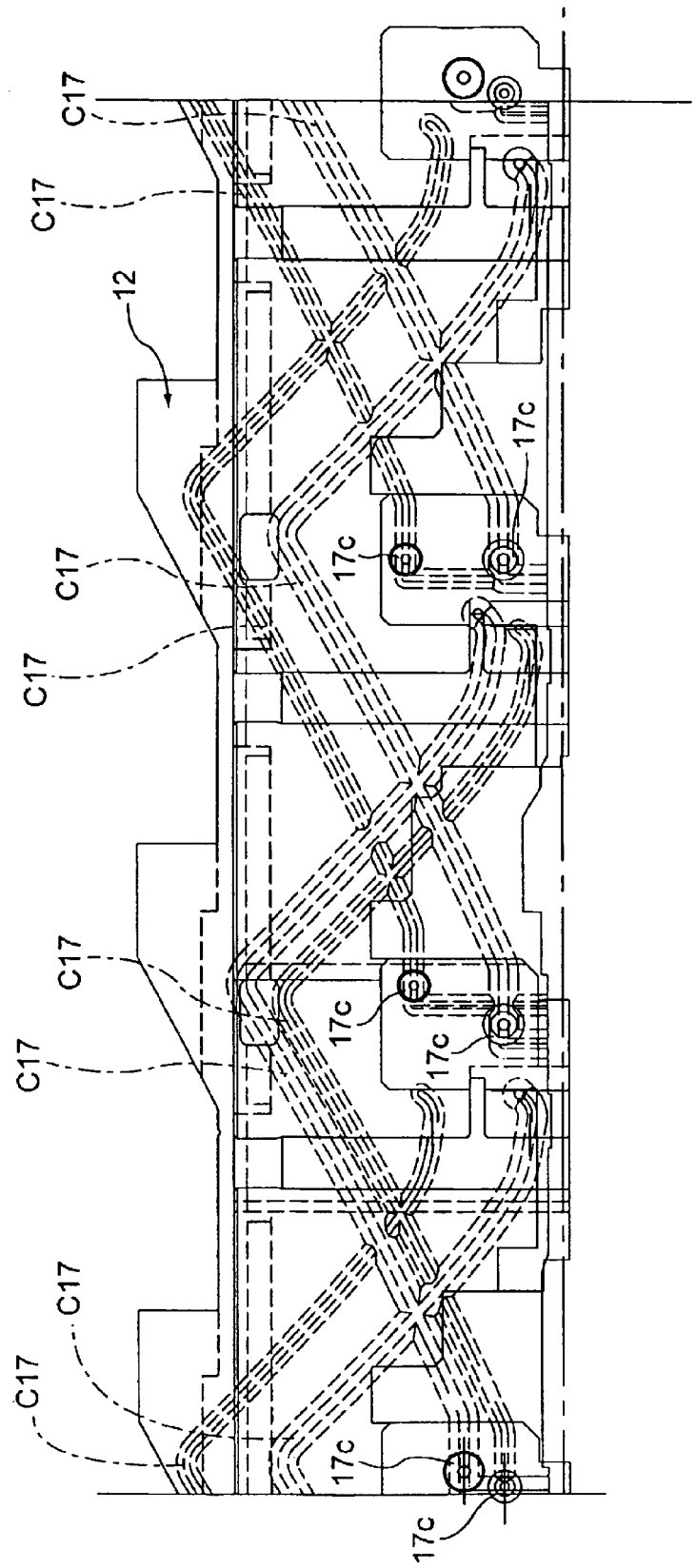
FIG. 19 is a developed view of the cam/helicoid ring, showing the shapes of a set of second cam grooves of the cam/helicoid ring for moving the second lens group.

The inner ring portion 15Y of the first lens group moving ring 15 is provided on an inner peripheral surface thereof with a set of three linear guide projections 15f which are elongated in a direction parallel to the optical axis O, while the second lens group moving ring 17 is provided with a set of three linear guide slots (linear guide through-slots) 17a which are elongated in a direction parallel to the optical axis O to be engaged with the set of three linear guide projections 15f to be freely slidable relative thereto along the optical axis O (see FIGS. 6, 7 and 17). Each linear guide projection 15f is provided along a substantially center thereof with a hanging groove 15e which is elongated in a direction parallel to the optical axis O and which has a substantially T-shaped cross section as shown in FIG. 6. The three linear guide projections 15f and the three linear guide slots 17a constitute a first linear guide mechanism. The rear end of each hanging groove 15e is closed (see FIGS. 17 and 18). The second lens group moving ring 17 is provided on an outer peripheral surface thereof with six cam followers 17c which are engaged in the set of six second cam grooves C17 of the cam/helicoid ring 12, respectively. The six cam followers 17c and the six second cam grooves C17 of the cam/helicoid ring 12 constitute a cam mechanism for moving the second lens group moving ring 17 along the optical axis.

Figure 11:
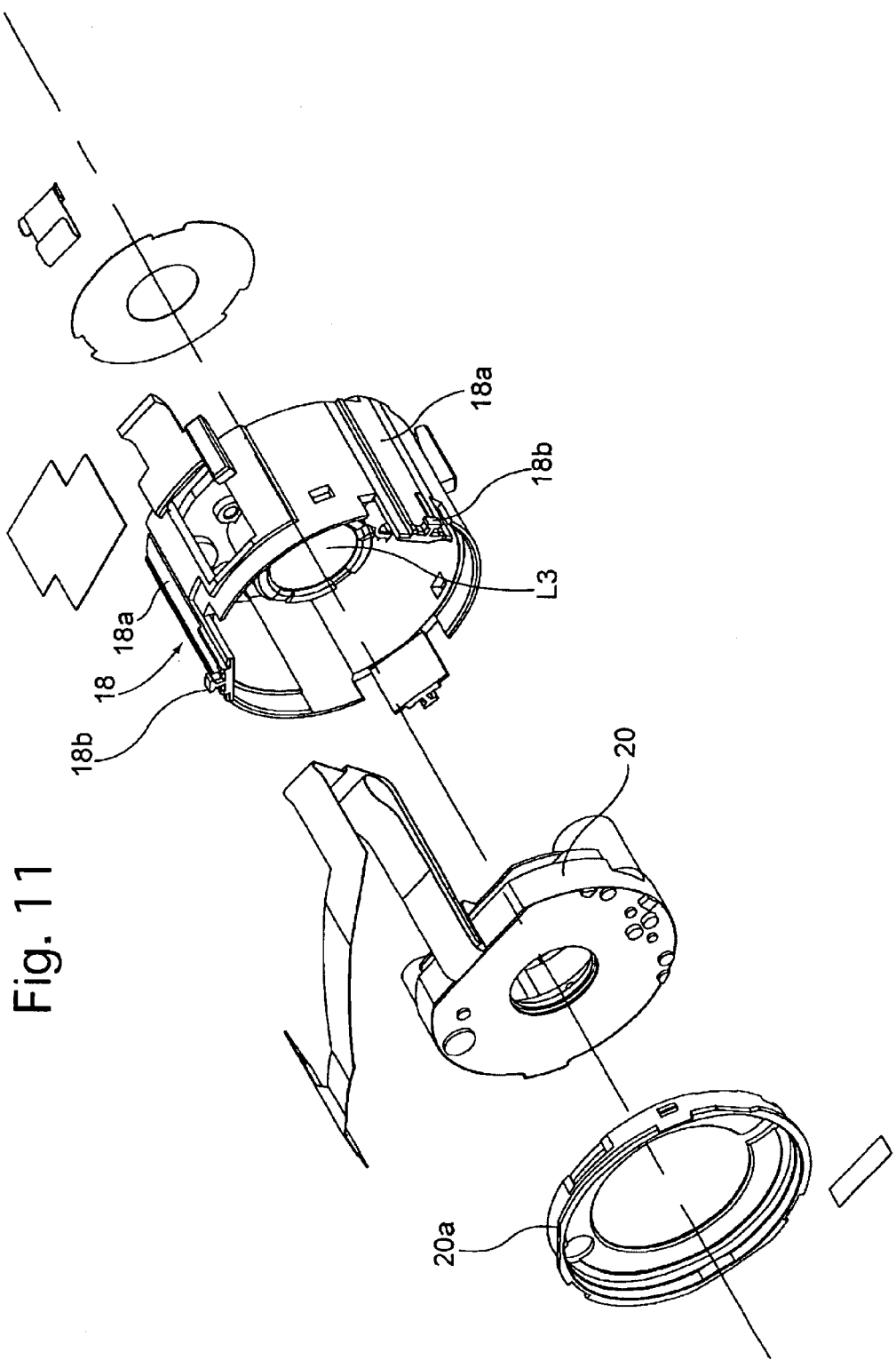
FIG. 11 is an exploded perspective view of a portion of the zoom lens barrel shown in FIG. 3, showing a third lens group moving ring and peripheral elements.

The zoom lens barrel 10 is provided inside the second lens group moving ring 17 with a third lens group moving ring (third lens frame) 18 which supports the third lens group L3. The third lens group moving ring 18 is provided on an outer peripheral surface thereof with a set of three linear guide projections 18a which are elongated in a direction parallel to the optical axis O to be engaged in the set of three linear guide slots 17a of the second lens group moving ring 17 to be freely slidable relative thereto along the optical axis O, respectively. The third lens group moving ring 18 is provided on a center of each linear guide projection 18a at the front end thereof with a linear moving key (stop projection) 18b (see FIGS. 11, 17 and 18) which has a substantially T-shaped cross section to be engaged in the associated hanging groove 15e. The three linear guide projections 15f, the three hanging groove 15e and the three linear moving keys 18b constitute a second linear guide mechanism. Furthermore, the three linear guide slots 17a and the three linear guide projections 18a constitute a third linear guide mechanism. As shown in FIG. 11, the zoom lens barrel 10 is provided with a shutter unit 20 which is inserted into the third lens group moving ring 18 to be positioned in front of the third lens group L3. The shutter unit 20 is fixed to the third lens group moving ring 18 by a fixing ring 20a. The zoom lens barrel 10 is provided between the third lens group moving ring 18 (the fixing ring 20a) and the second lens group moving ring 17 with a compression coil spring 21 which continuously biases the third lens group moving ring 18 rearwards relative to the second lens group moving ring 17. The rear limit of this rearward movement of the third lens group moving ring 18 relative to the second lens group moving ring 17 is determined by the three linear moving keys 18b contacting the closed rear ends of the three hanging grooves 15e, respectively. Namely, when the zoom lens barrel 10 is in a ready-to-photograph position, each linear moving key 18b remains in contact with the rear end of the associated hanging groove 15e of the first lens group moving ring 15 to keep the distance between the first lens group L1 and the third lens group L3 constant. When the zoom lens barrel 10 changes from a ready-to-photograph state to the retracted state shown in FIG. 3, a further rearward movement of the first lens group L1 in accordance with contours of the set of three first cam grooves C15, after the third lens group L3 (the third lens group moving ring 18) has reached the mechanical retracting limit thereof, causes the first lens group L1 to approach the third lens group L3 while compressing the compression coil spring 21 (see FIG. 1). Each linear moving key 18b is formed so that the radially outer end thereof bulges to be prevented from coming off the associated hanging groove 15e.

Figure 12:
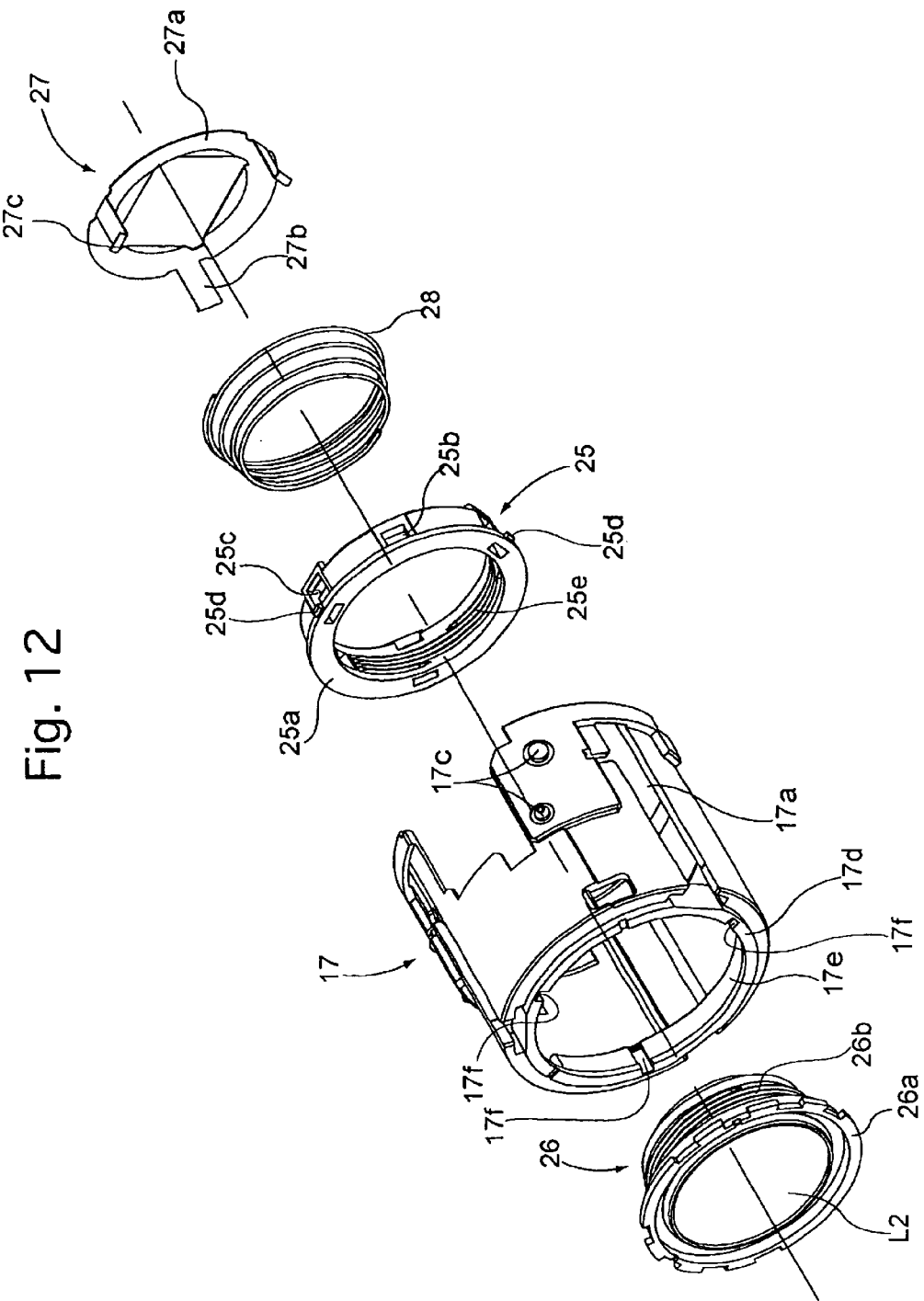
FIG. 12 is an exploded perspective view of a portion of the zoom lens barrel shown in FIG. 3, showing a second lens group moving ring and peripheral elements.
Figure 13:
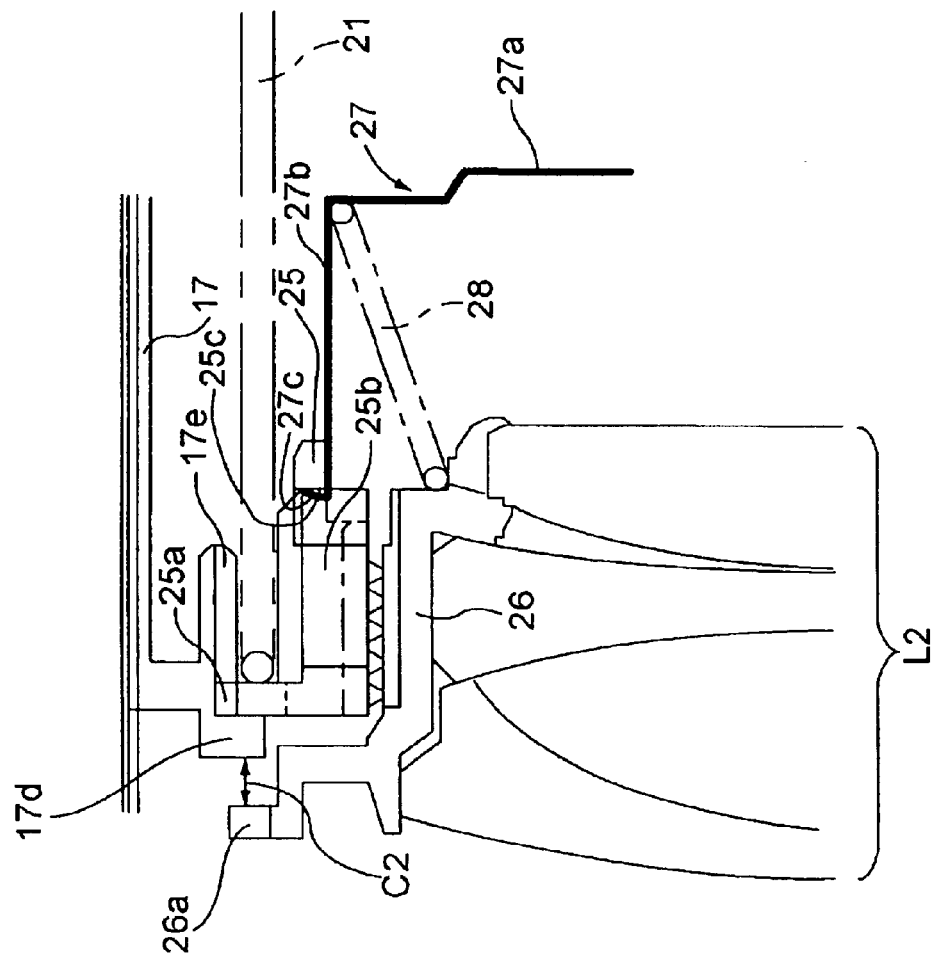
FIG. 13 is a longitudinal view of a portion of the zoom lens barrel shown in FIG. 3, showing a portion of the second lens group moving ring and peripheral elements.
Figure 14:
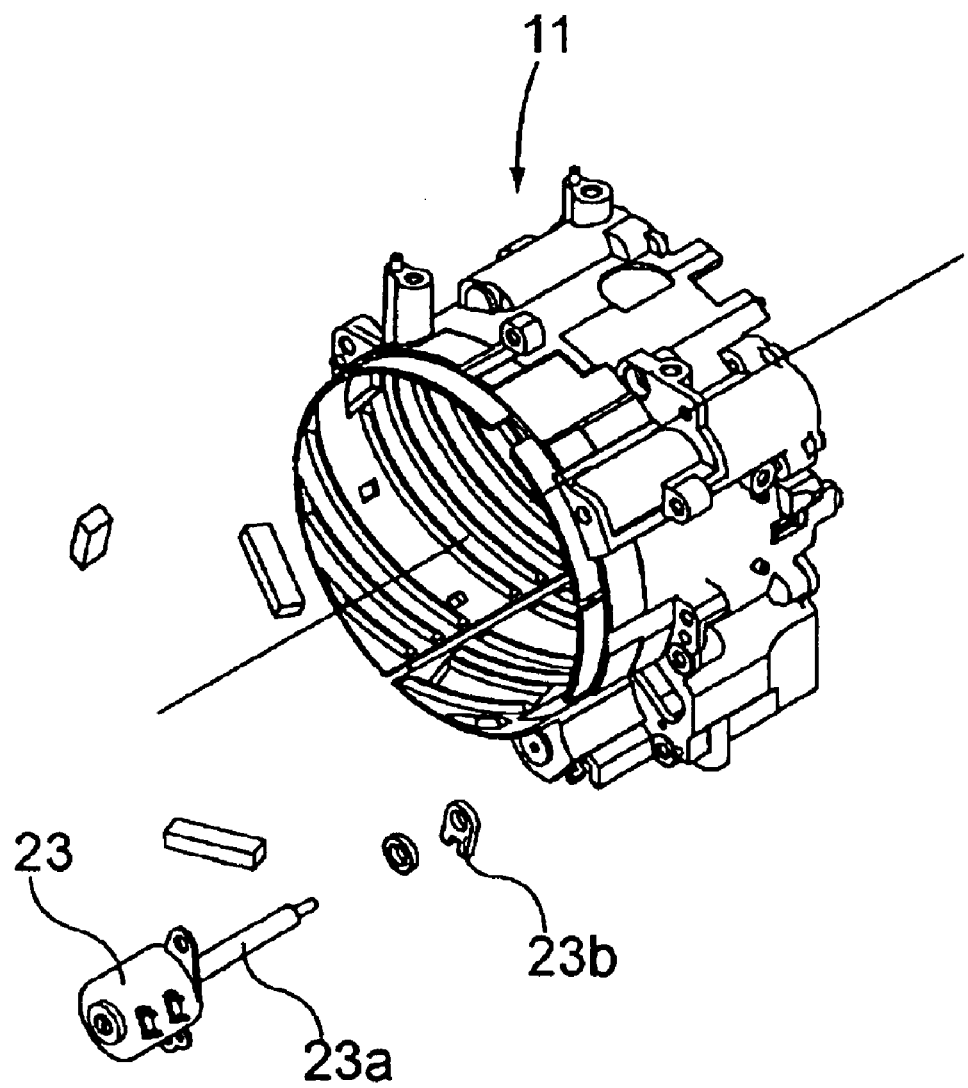
FIG. 14 is an exploded perspective view of a portion of the zoom lens barrel shown in FIG. 3, showing a stationary barrel, a pulse motor supported by the stationary barrel, and peripheral elements, seen from the rear side thereof.
Figure 15:
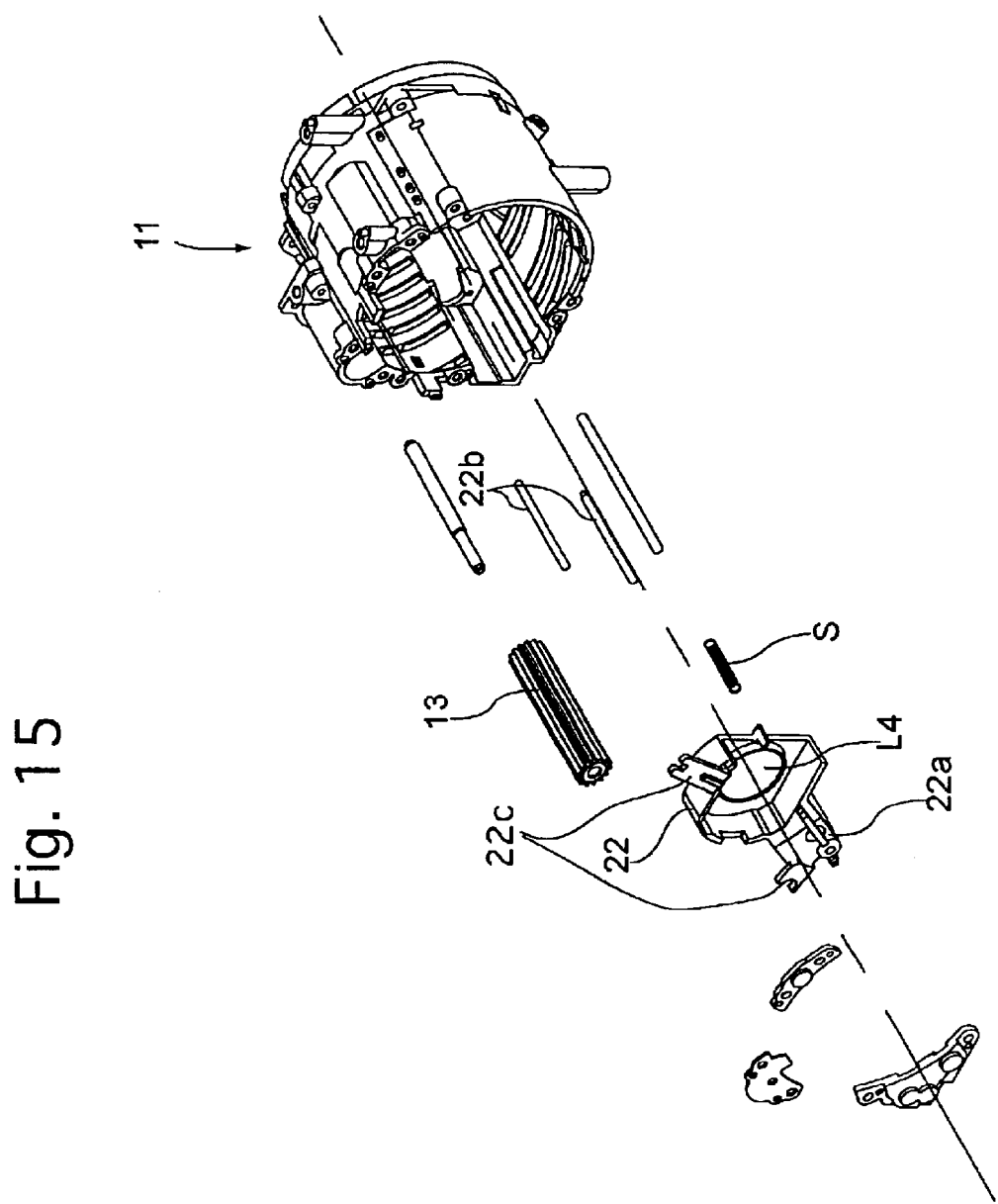
FIG. 15 is an exploded perspective view of a portion of the zoom lens barrel shown in FIG. 3, showing the stationary barrel, a fourth lens group and peripheral elements.

Although a biasing force of the compression coil spring 21 can be applied directly to the second lens group moving ring 17 (i.e., although the second lens group L2 can be fixed to the second lens group moving ring 17), the second lens group L2 is made to be capable of moving rearward relative to the second lens group moving ring 17 for the purpose of further reduction in length of the zoom lens barrel 10 in the retracted state thereof in the present embodiment of the zoom lens barrel. FIGS. 12 and 13 show this structure for the further reduction in length of the zoom lens barrel 10. The second lens group moving ring 17 is provided at the front end thereof with a cylindrical portion 17e having an inner flange 17d. Three linear guide grooves 17f, which extend parallel to the optical axis direction and open at the front and rear ends thereof, are formed at equi-angular intervals on the cylindrical portion 17e. The zoom lens barrel 10 is provided inside the second lens group moving ring 17 with an intermediate ring 25. The intermediate ring 25 is provided at the front end thereof with a flange portion 25a which is fitted in the cylindrical portion 17e to be freely slidable on the cylindrical portion 17e in the optical axis direction. An end portion of the compression coil spring 21 abuts against the flange portion 25a, so that the flange portion 25a presses against the inner flange 17d due to the resiliency of the compression coil spring 21. Three guide projections 25d which radially extend outwards are provided on the outer peripheral surface of the flange portion 25a. The three guide projections 25d are respectively engaged with the three linear guide grooves 17f of the second lens group moving ring 17 from the rear side of the second lens group moving ring 17. The three linear guide grooves 17f and the three guide projections 25d constitute a linear guide mechanism for guiding the intermediate ring 25 along the optical axis. Accordingly, the intermediate ring 25 is prevented from rotating about the optical axis with respect to the second lens group moving ring 17, and can only relatively move in the optical axis direction. The front face of the flange portion 25a can move forwards until sliding contact is made with the rear face of the inner flange 17d. The zoom lens barrel L2 is provided inside the second lens group moving ring 17 with a second lens group support frame 26 to which the second lens group L2 is fixed. A male thread 26b of the second lens group support frame 26 is screwed into female thread 25e formed on the inner periphery of the intermediate ring 25. Accordingly, the position of the second lens group L2 relative to the intermediate ring 25 which is prevented from rotating about the optical axis can be adjusted in the optical axis direction (zooming adjustment) by rotating the second lens group support frame 26 relative to the intermediate ring 25. After this adjustment, the second lens group support frame 26 can be permanently fixed to the intermediate ring 25 by putting drops of an adhesive agent into a radial through hole 25b formed on the intermediate ring 25. The second lens group support frame 26 is provided on an outer peripheral surface thereof with an outer flange 26a, and a clearance C2 (see FIG. 13) for the zooming adjustment exits between a front end surface of the inner flange 17d and the outer flange 26a. The compression coil spring 21 biases the intermediate ring 25 forward, and the intermediate ring 25 is held at a position where the flange portion 25a contacts with the inner flange 17d when the zoom lens barrel 10 is in a ready-to-photograph state. Namely, on the one hand, the position of the second lens group L2 is controlled by the set of six second cam grooves C17 when the zoom lens barrel 10 is in a ready-to-photograph state; on the other hand, the second lens group support frame 26 is pushed rearward mechanically by the rear end of the first lens group support frame 24 to thereby move the outer flange 26a of the second lens group support frame 26 rearward to a point where the outer flange 26a contacts with the inner flange 17d when the zoom lens barrel 10 is retracted to the retracted position thereof. This reduces the length of the zoom lens barrel 10 by a length corresponding to the clearance C2.

The zoom lens barrel 10 is provided immediately behind the intermediate ring 25 with a light shield ring 27 which is supported by the intermediate ring 25. As shown in FIG. 12, the light shield ring 27 is provided with a ring portion 27a and a set of three leg portions 27b which extend forward from the ring portion 27a at intervals of approximately 120 degrees. Each leg portion 27b is provided at the front end thereof with a hook portion 27c which is formed by bending the tip of the leg portion 27b radially outwards. The intermediate ring 25 is provided on an outer peripheral surface thereof with a set of three engaging holes 25c with which the hook portions 27c of the set of three leg portions 27b are engaged, respectively (see FIG. 12). The zoom lens barrel 10 is provided between the light shield ring 27 and the second lens group support frame 26 with a compression coil spring 28 having a substantially truncated conical shape which continuously biases the light shield ring 27 rearwards. Since the compression coil spring 28 continuously biases the light shield ring 27 rearwards, the hook portions 27c of the set of three leg portions 27b engaged with the set of three engaging holes 25c of the intermediate ring 25 determine (restrict) a rearward movement limit of the light shield ring 27. When the zoom lens barrel 10 is retracted toward the retracted position, the light shield ring 27 approaches the second lens group support frame 26 while compressing the compression coil spring 28 after reaching the mechanical retracting limit of the light shield ring 27. The lengths of the set of three engaging holes 25c in the optical axis direction are determined to allow the ring portion 27a to come into contact with the second lens group support frame 26.

The compression coil spring 28 also serves as a device for removing backlash between the intermediate ring 25 and the second lens group support frame 26 when the second lens group support frame 26 is rotated relative to the intermediate ring 25 for the aforementioned zooming adjustment. The zooming adjustment is performed by rotating the second lens group support frame 26 relative to the intermediate ring 25 to adjust the position of the second lens group L2 in the optical axis direction relative to the intermediate ring 25 while viewing the position of an object image. This zooming adjustment can be performed with precision with backlash between the intermediate ring 25 and the second lens group support frame 26 being removed by the compression coil spring 28.

The zoom lens barrel 10 is provided behind the third lens group moving ring 18 with a fourth lens group support frame 22 to which the fourth lens group L4 is fixed. As described above, the fourth lens group L4 is moved to make a slight focus adjustment to the vari-focal lens system to adjust a slight focal deviation thereof while the first through third lens groups L1, L2 and L3 are moved relative to one another to vary the focal length of the zoom lens system, and is also moved as a focusing lens group. The fourth lens group L4 is moved along the optical axis O by rotation of a pulse motor 23 (see FIGS. 5 and 14). The pulse motor 23 is provided with a rotary screw shaft 23a. A nut member 23b is screwed on the rotary screw shaft 23a to be prevented from rotating relative to the stationary barrel 11. The nut member 23b is continuously biased by an extension coil spring S in a direction to contact with a leg portion 22a which projects radially outwards from the fourth lens group support frame 22 (see FIGS. 5 and 15). The fourth lens group support frame 22 is prevented from rotating by guide bars 22b, which extend in direction parallel to the optical axis direction, which are slidably engaged with radial projecting followers 22c which extend radially outwards from the fourth lens group support frame 22 (see FIGS. 2 and 15). Accordingly, rotations of the pulse motor 23 forward and reverse cause the fourth lens group support frame 22 (the fourth lens group L4) to move forward and rearward along the optical axis O, respectively. Rotations of the pulse motor 23 are controlled in accordance with information on focal length and/or information on object distance.

Accordingly, in the above described embodiment of the zoom lens barrel, rotating the cam/helicoid ring 12 by rotation of the drive pinion 13 causes the first lens group moving ring 15, the exterior ring 16 and the second lens group moving ring 17 to move along the optical axis O in accordance with contours of the set of three first cam grooves C15, the set of three third cam grooves C16 and the set of six second cam grooves C17, respectively. When the first lens group moving ring 15 moves forward from the retracted position, firstly the three linear moving keys 18b contact the rear ends of the three hanging grooves 15e, respectively, and subsequently the third lens group moving ring 18 moves together with the first lens group moving ring 15 with the three linear moving key 18b remaining in contact with the rear ends of the three hanging grooves 15e, respectively. The position of the fourth lens group L4 is controlled by the pulse motor 23, whose rotations are controlled in accordance with information on focal length, to make a slight focus adjustment to the vari-focal lens system to adjust a slight focal deviation thereof. As a result, reference moving paths as shown in FIG. 1 for performing a zooming operation are obtained. Rotations of the pulse motor 23 are also controlled in accordance with information on object distance to perform a focusing operation.

As described above, in the above illustrated embodiment of the zoom lens barrel, the six cam followers 17c of the second lens group moving ring 17, which is positioned inside the cam/helicoid ring 12, are respectively engaged in the six second cam grooves C17 which are formed on an inner peripheral surface of the cam/helicoid ring 12, while the second lens group moving ring 17 is linearly guided by the first lens group moving ring 15. The intermediate ring 25, whose forward movement limit relative to the second lens group moving ring 17 in the optical axis direction is determined by the flange portion 25a abutting against the inner flange 17d of the second lens group moving ring 17, is fitted in the second lens group moving ring 17 to be freely movable along the optical axis O relative to the second lens group moving ring 17.

The third lens group moving ring 18 that supports the third lens group L3 is positioned behind the second lens group moving ring 17, and the third lens group moving ring 18 is linearly guided along the optical axis O by the inner ring portion 15Y of the first lens group moving ring 15 and the second lens group moving ring 17. In addition, the compression coil spring (second biasing device) 21, which continuously biases the intermediate ring 25 toward the frontmost moving limit thereof relative to the second lens group moving ring 17 and further continuously biases the second lens group moving ring 17 and the third lens group moving ring 18 in opposite direction away from each other, is installed between the intermediate ring 25 and the third lens group moving ring 18 in a compressed fashion. Forward and reverse rotations of the cam/helicoid ring 12 about the optical axis O cause the second lens group moving ring 17 and the third lens group moving ring 18 to move forward and rearward along the optical axis O so that each of the second lens group L2 and the third lens group L3 serves as a power-varying lens group.

The light shield ring (light shield member) 27, which includes the ring portion 27a and the set of three leg portions 27b that extend forward from the ring portion 27a at intervals of approximately 120 degrees, is positioned behind the intermediate ring 25. The hook portions 27c of the set of three leg portions 27b are supported by the intermediate ring 25. The truncated-conical-shaped compression coil spring (first biasing member) 28 is positioned in a compressed fashion between the second lens group support frame 26 and the ring portion 27a of the light shield ring 27 to continuously bias the light shield ring 27 rearward.

When the zoom lens barrel 10 is in a ready-to-photograph state, the ring portion 27a of the light shield ring 27 is moved to a rearward movement limit (at which the hook portions 27c of the set of three leg portions 27b of the light shield ring 27 are respectively engaged with the set of three engaging holes 25c of the intermediate ring 25) relative to the second lens group moving ring 17 by the compression coil spring 28, as shown in FIG. 13, to prevent harmful light rays from entering an optical path of the zoom lens optical system. Since the position of the ring portion 27a in the optical axis direction can be freely adjusted in accordance with a characteristic of the zoom lens optical system by changing the length of each leg portion 27b of the light shield ring 27, the light shield ring 27 can be disposed regardless of the position of the intermediate ring 25 which supports the light shield ring 27. This provides more freedom in design of the zoom lens barrel 10.

On the other hand, when the zoom lens barrel 10 changes from a ready-to-photograph state to the retracted state, the ring portion 27a comes in contact with the third lens group moving ring 18 while the ring portion 27a moves in a direction opposite to the direction of movement of the intermediate ring 25 to approach the second lens group moving ring 17 against the spring force of the compression coil spring 28. At this time, the hook portion 27c of each leg portion 27b approaches the inner flange 17d of the second lens group moving ring 17 through the inside of the cylindrical portion 17e so that the length of each leg portion 27b in the optical axis direction is included within the length of the cylindrical portion 17e in the optical axis direction.

The space between the second lens group support frame 26 and the ring portion 27a which exits when the zoom lens barrel 10 is in a ready-to-photograph state disappears when the zoom lens barrel 10 is in the retracted state. This reduces the length of the zoom lens barrel 10 in the retracted state thereof.

Additionally, the light shield ring 27 serves as a device for removing backlash between the female thread 25e of the intermediate ring 25 and the male thread 26b of the second lens group support frame 26 in cooperation with the compression coil spring 28 at the aforementioned zooming adjustment, in which the second lens group support frame 26 is rotated relative to relative to the intermediate ring 25. Since the zooming adjustment is performed to adjust the position of the second lens group L2 in the optical axis direction relative to the intermediate ring 25 while viewing the position of an object image, the backlash removal by a combination of the light shield ring 27 and the compression coil spring 28 makes it possible to perform the zooming adjustment with precision. Accordingly, a light shielding structure of the zoom lens barrel 10 can be used to remove backlash of a lens group whose position in the optical axis direction is adjusted during assembly of the zoom lens barrel 10.

The zoom lens barrel which has been discussed above with reference to FIGS. 1 through 19 is an example of an application of a light shielding structure devised according to the present invention. The present invention can be applied not only to a zoom lens barrel such as the above described zoom lens barrel 10, but also to any other zoom lens including a cam ring and a lens support ring, regardless of whether the cam ring includes a helicoid such as the male helicoid 12a of the cam/helicoid ring 12.

The present invention can be applied not only to a retractable zoom lens barrel but also to a retractable lens barrel having no zooming function.

According to the above description, a light shielding structure of a retractable lens barrel is provided, wherein design freedom of the light shielding structure is increased, and further miniaturization of the lens barrel is achieved.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A light shielding structure of a retractable lens barrel including a lens system, a position of said lens system changing between a ready-to-photograph position and a retracted position, said light shielding structure comprising:
    a lens frame to which a lens group of said lens system is fixed, a position of said lens group in an optical axis direction being adjusted during assembly;
    at least one movable annular member into which said lens frame is screw-engaged, said movable annular member being movable along said optical axis;
    a light shield member which prevents harmful light rays from entering said lens system, said light shield member being supported by said movable annular member to be movable along said optical axis relative to said movable annular member, while restricting a rearward movement limit of said light shield member relative to said movable annular member; and a biasing member which is positioned between said light shield member and said lens frame in a compressed fashion to bias said light shield member toward the rearward movement limit thereof relative to said movable annular member.

2. The light shielding structure according to claim 1, wherein said lens system comprises a zoom lens optical system which changes a focal length during a zooming operation, wherein said movable annular member comprises:

a moving ring which is moved along said optical axis by a cam mechanism in accordance with said zooming operation; and an intermediate ring into which said lens frame is screw-engaged, said intermediate ring being supported by said moving ring to be movable along said optical axis relative to said moving ring, a forward movement limit of said intermediate ring being restricted relative to said moving ring, and wherein said light shielding structure includes a second biasing member for continuously biasing said intermediate ring forward.

3. The light shielding structure according to claim 1, wherein said lens group that is fixed to said lens frame serves as a power-varying lens group of said lens system which is moved to vary a focal length.

4. The light shielding structure according to claim 2, wherein a male screw thread formed on an outer peripheral surface of said lens frame is engaged with a female screw thread formed on an inner peripheral surface of said intermediate ring.

5. The light shielding structure according to claim 2, wherein said intermediate ring is linearly guided along said optical axis without rotating relative to said moving ring.

6. The light shielding structure according to claim 1, wherein said biasing member comprises a compression coil spring.

7. The light shielding structure according to claim 2, wherein said second biasing member comprises a compression coil spring.

8. The light shielding structure according to claim 1, wherein said light shield member comprises:

a ring portion positioned around said optical axis; and a plurality of leg portions which extend forward from said ring portion so that front ends of said plurality of leg portions are engaged with said intermediate ring.

9. The light shielding structure according to claim 1, wherein said lens group is positioned behind a frontmost lens group of said lens system.

10. The light shielding structure according to claim 2, wherein said cam mechanism comprises:

a cam ring which is positioned around said moving ring to be rotatable relative to said moving ring, and includes a plurality of inner cam grooves formed on an inner peripheral surface of said cam ring; and a plurality of cam followers which project radially outwards from said moving ring to be engaged in said plurality of inner cam grooves, respectively.

11. The light shielding structure according to claim 1, wherein said retractable lens barrel comprises a linear guide mechanism, positioned between said moving ring and said intermediate ring, for guiding said intermediate ring linearly along said optical axis without rotating said intermediate ring relative to said moving ring.

* * * * *